(12) United States Patent
Sugiura et al.

(10) Patent No.: US 11,867,237 B2
(45) Date of Patent: Jan. 9, 2024

(54) ROLLING ELEMENT CAM AND CLUTCH DEVICE USING SAME

(71) Applicant: DENSO CORPORATION, Kariya (JP)

(72) Inventors: Takumi Sugiura, Kariya (JP); Akira Takagi, Kariya (JP); Ryo Ishibashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 577 days.

(21) Appl. No.: 17/137,727

(22) Filed: Dec. 30, 2020

(65) Prior Publication Data

US 2021/0115980 A1    Apr. 22, 2021

Related U.S. Application Data

(63) Continuation of application No. PCT/JP2019/026701, filed on Jul. 4, 2019.

(30) Foreign Application Priority Data

Jul. 6, 2018   (JP) .................................. 2018-128691
Jun. 6, 2019   (JP) .................................. 2019-106250

(51) Int. Cl.
*F16D 13/52*        (2006.01)
*F16D 23/12*        (2006.01)
(Continued)

(52) U.S. Cl.
CPC ............. *F16D 13/52* (2013.01); *F16D 23/12* (2013.01); *F16H 25/12* (2013.01); *F16D 28/00* (2013.01); *F16D 2023/123* (2013.01)

(58) Field of Classification Search
CPC .......... F16D 13/52; F16D 23/23; F16D 28/00; F16D 2023/123; F16H 25/12
(Continued)

(56) References Cited

U.S. PATENT DOCUMENTS 10,030,697 B2 *  7/2018  Carr ..................... F16C 19/30
2010/0282564 A1 * 11/2010  Krieberneg ........... F16D 27/115
                                                    192/70.251
(Continued)

FOREIGN PATENT DOCUMENTS

JP             3-66927         3/1991
JP         2006-312973        11/2006
(Continued)

OTHER PUBLICATIONS

U.S. Appl. No. 17/137,725, filed Dec. 30, 2020, Clutch Device.
(Continued)

*Primary Examiner* — Colby M Hansen
(74) *Attorney, Agent, or Firm* — Nixon & Vanderhye P.C.

(57) ABSTRACT

At a drive cam slope groove, a groove bottom is sloped relative to one end surface of a drive cam such that a depth of the groove bottom continuously decreases from one side toward other side in a circumferential direction. At a drive cam planar groove, the groove bottom is parallel to the one end surface of the drive cam. A drive cam connection groove has: one end connected to an end of the drive cam slope groove located on the other side in the circumferential direction of the drive cam; and the other end connected to an end of the drive cam planar groove located on the one side in the circumferential direction. A slope angle of the groove bottom relative to the one end surface of the drive cam continuously changes from the one end to the other end of the drive cam connection groove.

10 Claims, 18 Drawing Sheets

(51) Int. Cl.
*F16H 25/12* (2006.01)
*F16D 28/00* (2006.01)

(58) Field of Classification Search
USPC ...................................................... 192/54.52
See application file for complete search history.

(56) References Cited

U.S. PATENT DOCUMENTS

| | | |
|---|---|---|
| 2014/0077641 A1 | 3/2014 | Ratte et al. |
| 2015/0038295 A1* | 2/2015 | Yoshimura ............. B60W 10/11 477/86 |
| 2016/0238107 A1 | 8/2016 | Hirota et al. |
| 2018/0080508 A1 | 3/2018 | Nahrwold et al. |
| 2018/0238402 A1 | 8/2018 | Saito et al. |

FOREIGN PATENT DOCUMENTS

| | | |
|---|---|---|
| JP | 2009-108973 | 5/2009 |
| JP | 2011-226500 | 11/2011 |

OTHER PUBLICATIONS

U.S. Appl. No. 17/137,726, filed Dec. 30, 2020, Clutch Device.
U.S. Appl. No. 17/137,730, filed Dec. 30, 2020, Clutch Device.
U.S. Appl. No. 17/137,725, to Sugiura, et al., entitled "Clutch Device", filed Dec. 30, 2020 (55 pages).
U.S. Appl. No. 17/137,726, to Takagi, et al., entitled "Clutch Device", filed Dec. 30, 2020 (57 pages).
U.S. Appl. No. 17/137,730, to Ishibashi, et al., entitled "Clutch Device", filed Dec. 30, 2020 (47 pages).

\* cited by examiner

ROLLING ELEMENT CAM AND CLUTCH DEVICE USING SAME

CROSS REFERENCE TO RELATED APPLICATIONS

This application is a continuation application of International Patent Application No. PCT/JP2019/026701 filed on Jul. 4, 2019, which designated the U.S. and claims the benefit of priority from Japanese Patent Application No. 2018-128691 filed on Jul. 6, 2018 and Japanese Patent Application No. 2019-106250 filed on Jun. 6, 2019. The entire disclosures of all of the above applications are incorporated herein by reference.

TECHNICAL FIELD

The present disclosure relates to a rolling element cam and a clutch device using the same.

BACKGROUND

Previously, there has been proposed a rolling element cam, in which a drive cam is rotated by torque of rotation outputted from a drive device while a speed of the rotation outputted from the drive device is reduced through a speed reducer before transmission of the rotation to the drive cam. When the drive cam is rotated, a rolling element is rolled along a cam groove of the drive cam and a cam groove of a driven cam to move the driven cam in an axial direction relative to the drive cam.

Furthermore, there has been proposed a clutch device that includes the rolling element cam and a clutch while the clutch is configured to shift its operational state to a coupled state or a decoupled state depending on a relative position of the driven cam relative to the drive cam in the axial direction to enable or disable transmission of the torque between a first transmitter and a second transmitter through the clutch.

SUMMARY

This section provides a general summary of the disclosure, and is not a comprehensive disclosure of its full scope or all of its features.

According to the present disclosure, there is provided a rolling element cam that includes a drive cam, a plurality of rolling elements, and a driven cam. The drive cam has a plurality of drive cam grooves formed at one end surface of the drive cam. The drive cam is configured to be rotated by torque outputted from a drive device. Each of the plurality of rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. When relative rotation is made between the driven cam and the drive cam, the driven cam is moved relative to the drive cam in an axial direction.

According to the present disclosure, there is also provided a clutch device that includes a first transmitter, a drive device, the rolling element cam, a second transmitter and a clutch. The drive device is configured to output torque. The second transmitter is configured to transmit the torque between the first transmitter and the second transmitter. The clutch is configured to shift an operational state of the clutch to a coupled state or a decoupled state depending on a relative position of the driven cam relative to the drive cam in the axial direction. The clutch is configured to enable transmission of the torque between the first transmitter and the second transmitter through the clutch in the coupled state and disable the transmission of the torque between the first transmitter and the second transmitter through the clutch in the decoupled state.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
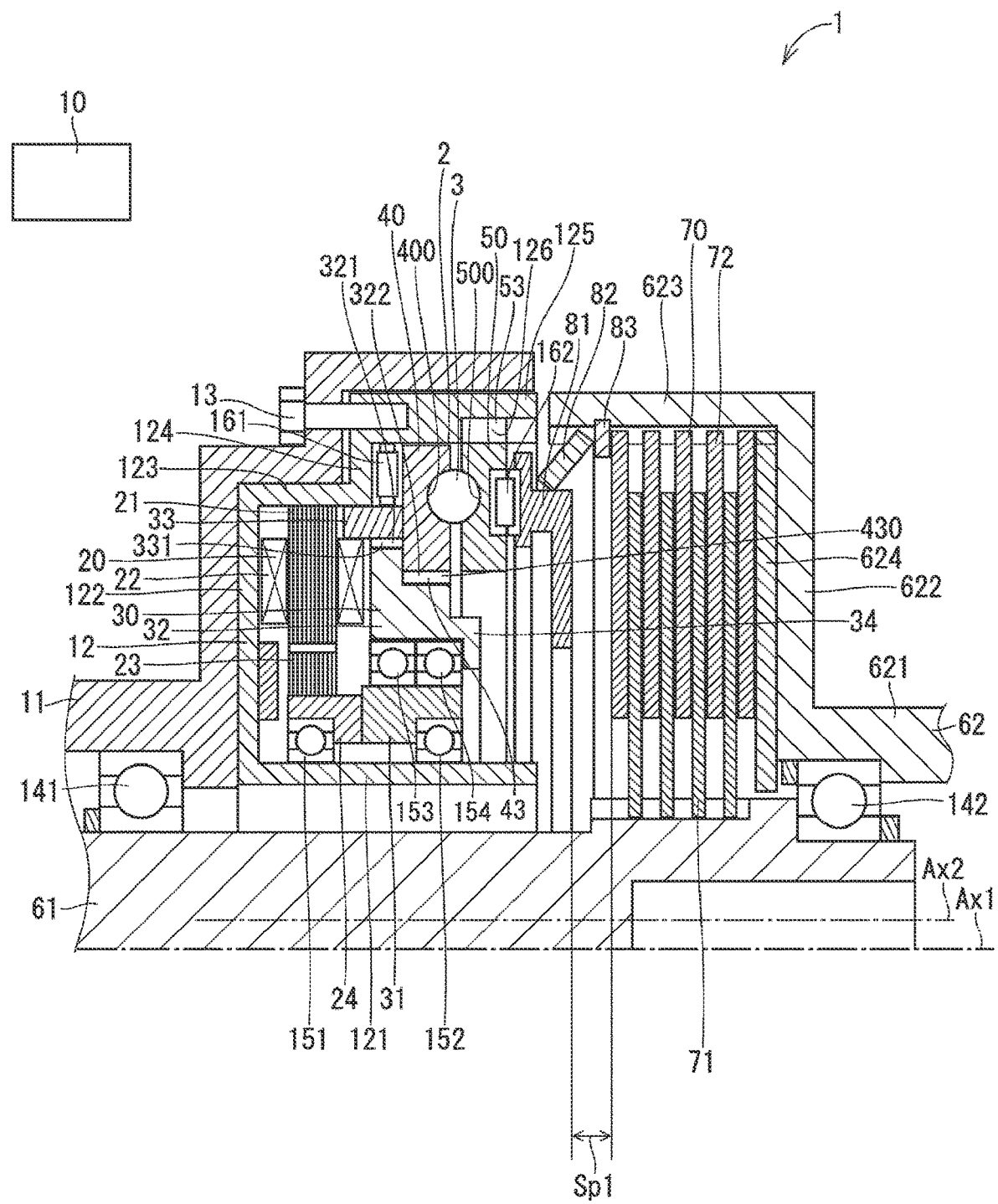
FIG. 1 is a cross-sectional view of a clutch device according to a first embodiment.

Previously, there has been proposed a rolling element cam, in which a drive cam is rotated by torque of rotation outputted from a drive device while a speed of the rotation outputted from the drive device is reduced through a speed reducer before transmission of the rotation to the drive cam. When the drive cam is rotated, a rolling element is rolled along a cam groove of the drive cam and a cam groove of a driven cam to move the driven cam in an axial direction relative to the drive cam.

Furthermore, there has been proposed a clutch device that includes the rolling element cam and a clutch while the clutch is configured to shift its operational state to a coupled state or a decoupled state depending on a relative position of the driven cam relative to the drive cam in the axial direction to enable or disable transmission of the torque between a first transmitter and a second transmitter through the clutch.

In the clutch device, the cam groove of the drive cam and the cam groove of the driven cam, along which the rolling element is rolled, respectively have: a slope groove, in which a groove bottom is sloped relative to an end surface of the drive cam or the driven cam; and a planar groove bottom, in which the groove bottom is parallel to the end surface of the drive cam or the driven cam. A position of the driven cam relative to the drive cam in the axial direction is changed through the rotation of the rolling element along the slope groove. When the rolling element is placed at the planar groove, a reverse efficiency of the rolling element cam becomes equal to smaller than 0 (zero). Therefore, the supply of the electric power to the drive device can be cut to reduce the electric power consumption.

In general, due manufacturing variations of the drive cam and the driven cam, the timing, at which the rolling element moves from the slope groove to the planar groove, differs between the drive cam and the driven cam. In the previously proposed rolling element cam, in a cross section that extends along the groove bottom of the cam groove and is perpendicular to the end surface of the drive cam or the driven cam, a connection between the slope groove and the planar groove forms a sharp corner having an edge. Therefore, due to the occurrence of the deviation of the timing, at which the rolling element moves from the slope groove to the planar groove, between the drive cam and the driven cam, a clamp angle of the rolling element, which is an angle of clamping the rolling element between the drive cam and the driven cam, rapidly changes, and thereby the rolling element is slipped in a direction, in which a force is applied to the rolling element. This is a phenomenon called popping. When the popping occurs, the amount of stroke of the driven cam, which is a change in the relative position of the driven cam relative to the drive cam in the axial direction, deviates from a desired value, and an urging force, which urges the driven cam in the axial direction, is reduced.

In order to limit the occurrence of the popping, it is required to reduce the slope angle of the groove bottom at the slope groove, and thereby a degree of design freedom is deteriorated. This makes it impossible to select optimum specifications for a mechanical efficiency of the clutch device, so that the size of the drive device, specifically, the size of the clutch device may possibly be increased.

According to the present disclosure, there is provided a rolling element cam that includes a drive cam, a plurality of rolling elements and a driven cam.

The drive cam has a plurality of drive cam grooves formed at one end surface of the drive cam, and the drive cam is configured to be rotated by torque outputted from a drive device. Each of the rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. When relative rotation is made between the driven cam and the drive cam, the driven cam is moved relative to the drive cam in an axial direction.

Each of the plurality of drive cam grooves has a drive cam slope groove, a drive cam planar groove and a drive cam connection groove. At the drive cam slope groove, a groove bottom is sloped relative to the one end surface of the drive cam such that a depth of the groove bottom continuously decreases from one side toward another side in a circumferential direction of the drive cam. At the drive cam planar groove, the groove bottom is parallel to the one end surface of the drive cam such that the depth of the groove bottom is constant in the circumferential direction of the drive cam. The drive cam connection groove has: one end connected to an end of the drive cam slope groove located on the another side in the circumferential direction of the drive cam; and another end connected to an end of the drive cam planar groove located on the one side in the circumferential direction of the drive cam. A slope angle of the groove bottom relative to the one end surface of the drive cam continuously changes from the one end to the another end of the drive cam connection groove.

Each of the plurality of driven cam grooves has a driven cam slope groove, a driven cam planar groove and a driven cam connection groove. At the driven cam slope groove, a groove bottom is sloped relative to the one end surface of the driven cam such that a depth of the groove bottom continuously decreases from one side toward another side in a circumferential direction of the driven cam. At the driven cam planar groove, the groove bottom is parallel to the one end surface of the driven cam such that the depth of the groove bottom is constant in the circumferential direction of the driven cam. The driven cam connection groove has: one end connected to an end of the driven cam slope groove located on the another side in the circumferential direction of the driven cam; and another end connected to an end of the driven cam planar groove located on the one side in the circumferential direction of the driven cam. A slope angle of the groove bottom relative to the one end surface of the driven cam continuously changes from the one end to the another end of the driven cam connection groove.

In the present disclosure, when the rolling element is located at the drive cam planar groove and the driven cam planar groove, the supply of the electric power to the electric motor can be cut to reduce the electric power consumption. Furthermore, in the present disclosure, the drive cam groove has the drive cam connection groove, and the driven cam groove has the driven cam connection groove. Therefore, when the rolling element moves from the drive cam slope groove and the driven cam slope groove to the drive cam planar groove and the driven cam planar groove, it is possible to gently change the clamp angle of the rolling element and to reduce the amount of change in the clamp angle of the rolling element. Thus, the occurrence of the popping can be limited. As a result, the degree of the design freedom of the drive cam groove and the driven cam groove can be increased, and the size of the drive device and the size of the rolling element cam can be reduced. Thus, the size of the clutch device, at which the rolling element cam is applied, can be reduced.

Hereinafter, a rolling element cam and a clutch device according to a plurality of embodiments will be described with reference to the drawings. In addition, in the following embodiments, the substantially same components are denoted by the same reference signs, and the description thereof will be omitted. Furthermore, in the following embodiments, substantially the same constituent parts have the same or similar action and effect.

First Embodiment

FIG. 1 indicates a rolling element cam and a clutch device according to a first embodiment. The clutch device 1 is installed, for example, between an internal combustion engine and a transmission at a vehicle and is used to enable or disable transmission of torque between the internal combustion engine and the transmission.

The clutch device 1 includes: an electronic control unit (hereinafter referred to as an ECU) 10, which serves as a controller; an input shaft 61, which serves as a first transmitter; an electric motor 20, which serves as a drive device; a speed reducer 30; a housing 12; a ball cam 2, which serves as a rolling element cam; an output shaft 62, which serves as a second transmitter; a clutch 70; and a piston 81, which serves as a state shifter.

The ball cam 2 includes a drive cam 40, a plurality of balls 3 and a driven cam 50.

The ECU 10 is a microcomputer that includes: a CPU, which serves as an arithmetic unit; a ROM, a RAM and an EEPROM, which serve as a storage unit; and an I/O device, which serves as an input/output unit. The ECU 10 controls various devices and instruments of the vehicle by executing various computing operations according to a program stored in the ROM or the like based on information such as signals from various sensors provided in corresponding parts of the vehicle. As described above, the ECU 10 executes the program stored in the non-transitory computer-readable storage medium. By executing this program, a method corresponding to the program is executed.

The ECU 10 can control the operation of, for example, the internal combustion engine based on the information such as signals from the various sensors. Further, the ECU 10 can control the operation of the electric motor 20 described later.

The input shaft 61 is connected to, for example, a drive shaft of the internal combustion engine (not shown) and can be rotate together with the drive shaft. That is, torque is input to the input shaft 61 from the drive shaft.

A stationary flange 11 is installed to the vehicle that has the internal combustion engine. The stationary flange 11 is shaped in a tubular form and is fixed to, for example, an engine room of the vehicle. A bearing 141 is installed between an inner peripheral wall of the stationary flange 11 and an outer peripheral wall of the input shaft 61. Therefore, the input shaft 61 is rotatably supported by the stationary flange 11 through the bearing 141.

The housing 12 is placed between an inner peripheral wall of an end part of the stationary flange 11 and the outer peripheral wall of the input shaft 61. The housing 12 includes: an inner tubular portion 121; an inner bottom portion 122; an outer tubular portion 123; an outer bottom portion 124, which serves as a bottom portion; an outer tubular portion 125, which serves as a tubular portion; and a plurality of spline grooves 126.

The inner tubular portion 121 is shaped generally in a cylindrical tubular form. The inner bottom portion 122 is formed integrally with the inner tubular portion 121 in one-piece such that the inner bottom portion 122 is shaped in a ring plate form and radially outwardly extends from an end part of the inner tubular portion 121. The outer tubular portion 123 is formed integrally with the inner bottom portion 122 in one-piece such that the outer tubular portion 123 is shaped generally in a cylindrical tubular form and extends from an outer peripheral part of the inner bottom portion 122 toward the outer bottom portion 124. The outer bottom portion 124 is formed integrally with the outer tubular portion 123 in one-piece such that the outer bottom portion 124 is shaped in a ring plate form and radially outwardly extends from an end part of the outer tubular portion 123, which is opposite to the inner bottom portion 122. The outer tubular portion 125 is formed integrally with the outer bottom portion 124 such that the outer tubular portion 125 is shaped generally in a cylindrical tubular form and extends from an outer peripheral part of the outer bottom portion 124 toward a side that is opposite to the outer tubular portion 123. The spline grooves 126 are formed at an inner peripheral wall of an end part of the outer tubular portion 125, which is opposite to the outer bottom portion 124. The spline grooves 126 are arranged one after another in a circumferential direction of the outer tubular portion 125 and extend from an end part of the outer tubular portion 125 toward the outer bottom portion 124.

The housing 12 is installed to the stationary flange 11 such that an outer peripheral wall of the outer tubular portion 123 and an outer peripheral wall of the outer tubular portion 125 are opposed to an inner peripheral wall of an end part of the stationary flange 11. The housing 12 is fixed to the stationary flange 11 by bolts 13. Here, the housing 12 is coaxial with the stationary flange 11 and the input shaft 61. A space, which is shaped generally in a cylindrical tubular form, is formed between an inner peripheral wall of the inner tubular portion 121 and the outer peripheral wall of the input shaft 61.

The electric motor 20 includes a stator 21, a coil 22, a rotor 23 and a shaft 24. The stator 21 is formed by, for example, laminated steel plates and is shaped generally in a circular ring form, and the stator 21 is fixed to an inside of the outer tubular portion 123. Specifically, the stator 21 of the electric motor 20 is installed to the outer tubular portion 123 of the housing 12 such that the stator 21 is not movable relative to the outer tubular portion 123. The coil 22 is wound around the stator 21. The rotor 23 is formed by, for example, laminated steel plates and is shaped generally in a circular ring form, and the rotor 23 is placed at an inside of the stator 21 such that the rotor 23 is rotatable relative to the stator 21. The shaft 24 is shaped generally in a cylindrical tubular form, and the shaft 24 is installed to an inside of the rotor 23 and is integrated with the rotor 23. The shaft 24 is located on a radially outer side of the inner tubular portion 121 of the housing 12. A bearing 151 is installed between an inner peripheral wall of the shaft 24 and an outer peripheral wall of the inner tubular portion 121. In this way, the rotor 23 and the shaft 24 are rotatably supported by the inner tubular portion 121 through the bearing 151.

The housing 12 is not movable relative to the stator 21 of the electric motor 20.

The ECU 10 is configured to control an operation of the electric motor 20 by controlling an electric power supplied to the coil 22. When the electric power is supplied to the coil 22, a rotating magnetic field is generated at the stator 21. Thereby, the rotor 23 is rotated. Thus, torque is outputted from the shaft 24. As described above, the electric motor 20 is configured to output the torque.

The speed reducer 30 includes: an eccentric portion 31, which serves as an eccentric rotatable body; a planetary gear 32; a ring gear 33; and a ring gear 430, which serves as an output member. The eccentric portion 31 is shaped in a tubular form such that an outer peripheral wall of the eccentric portion 31 is eccentric to an inner peripheral wall of the eccentric portion 31. The eccentric portion 31 is located on a radially outer side of the inner tubular portion 121 and is formed integrally with the shaft 24 such that the inner peripheral wall of the eccentric portion 31 is coaxial with the shaft 24. Specifically, the eccentric portion 31 and the shaft 24 are not rotatable relative to each other. Therefore, the eccentric portion 31 is rotatable integrally with the shaft 24 in a state where the outer peripheral wall of the eccentric portion 31 is eccentric to the shaft 24. A bearing 152 is installed between the inner peripheral wall of the eccentric portion 31 and the outer peripheral wall of the inner tubular portion 121. Thus, the eccentric portion 31 is rotatably supported by the inner tubular portion 121 through the bearing 152.

The eccentric portion 31 has an axis Ax2 that is eccentric to an axis Ax1 of the electric motor 20. The axis Ax1 coincides with a central axis of the inner peripheral wall of the eccentric portion 31. The axis Ax2 coincides with a central axis of the outer peripheral wall of the eccentric portion 31. The eccentric portion 31 is rotatable about the axis Ax1 of the electric motor 20 relative to the inner tubular portion 121 of the housing 12. Furthermore, the axis Ax1 of the electric motor 20 coincides with a central axis of the shaft 24.

The planetary gear 32 is shaped generally in a circular ring form. The planetary gear 32 has a plurality of primary external teeth 321 and a plurality of secondary external teeth 322. The primary external teeth 321 are formed at an outer peripheral wall of the planetary gear 32 at one axial end of the planetary gear 32. The secondary external teeth 322 are formed at the planetary gear 32 on the other axial end side of the primary external teeth 321. A diameter of an addendum circle of the secondary external teeth 322 is smaller than a diameter of an addendum circle of the primary external teeth 321. The primary external teeth 321 and the secondary external teeth 322 are coaxial with an inner peripheral wall of the planetary gear 32.

The planetary gear 32 is located on a radially outer side of the eccentric portion 31. A bearing 153 and a bearing 154 are installed between the inner peripheral wall of the planetary gear 32 and the outer peripheral wall of the eccentric portion 31. Thus, the planetary gear 32 is rotatably supported by the eccentric portion 31 through the bearing 153 and the bearing 154. The planetary gear 32 is coaxially rotatable relative to the eccentric portion 31 and is rotatable relative to the shaft 24 in a state where the planetary gear 32 is eccentric to the shaft 24.

The ring gear 33 is shaped generally in a ring form. The ring gear 33 has a plurality of internal teeth 331. The internal teeth 331 are formed at an inner peripheral wall of the ring gear 33 at one axial end of the ring gear 33. The ring gear 33 is fixed to the housing 12 such that an outer peripheral wall of an end part of the ring gear 33, which is opposite to the internal teeth 331, is fitted to an inner peripheral wall of an end part of the outer tubular portion 123 of the housing 12. A diameter of an addendum circle of the internal teeth 331 is larger than the diameter of the addendum circle of the primary external teeth 321 of the planetary gear 32. Furthermore, the number of the internal teeth 331 is larger than the number of the primary external teeth 321.

The planetary gear 32 is installed such that the primary external teeth 321 are meshed with the internal teeth 331 of the ring gear 33. Therefore, when the rotor 23 and the shaft 24 are rotated, the planetary gear 32 is revolved and rotated at an inside of the ring gear 33 while the primary external teeth 321 of the planetary gear 32 are meshed with the internal teeth 331 of the ring gear 33.

Figure 2:
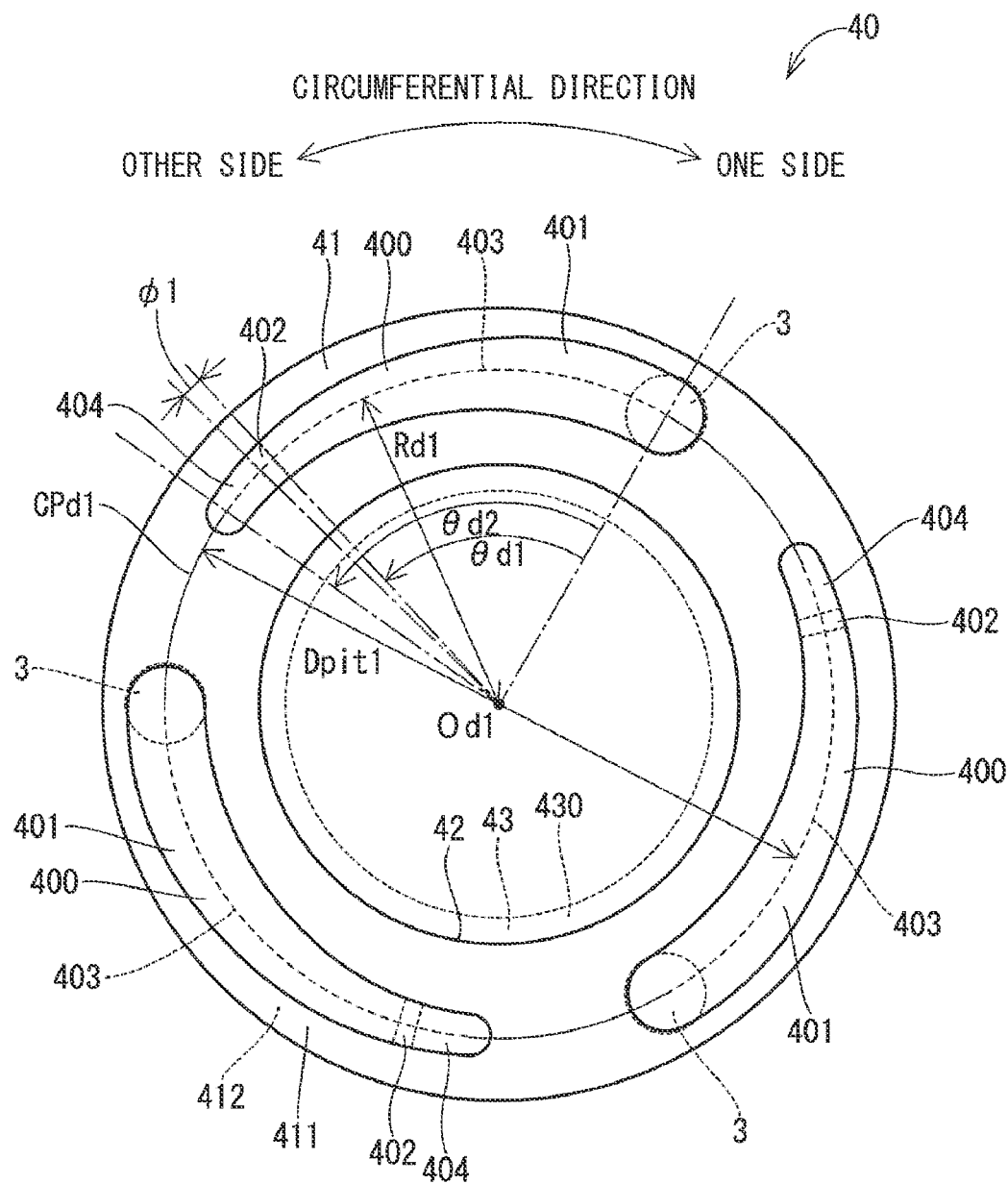
FIG. 2 is a diagram indicating a drive cam of the clutch device according to the first embodiment.

The drive cam 40 includes a drive cam main body 41, a drive cam hole 42 and a plurality of drive cam grooves 400 (see FIG. 2). The drive cam main body 41 is shaped generally in a circular plate form and is made of, for example, metal. The drive cam hole 42 is shaped in a circular form and is coaxial with the drive cam main body 41 such that the drive cam hole 42 extends through a center of the drive cam main body 41.

The drive cam grooves 400 are recessed from one end surface 411 of the drive cam main body 41 toward the other end surface 412 of the drive cam main body 41 in the axial direction. Each of the drive cam grooves 400 is formed such that a depth of the drive cam groove 400 changes in a circumferential direction of the drive cam 40. The number of the drive cam grooves 400 is three, and these three drive cam grooves 400 are arranged one after another at equal intervals in the circumferential direction of the drive cam main body 41. Details of the drive cam grooves 400 will be described later.

The ring gear 430, which serves as an output member of the speed reducer 30, is shaped in a ring form and is formed integrally with the drive cam 40 in one-piece at a radially inner side of the drive cam hole 42 of the drive cam 40. The ring gear 430 includes a plurality of drive cam internal teeth 43. The drive cam internal teeth 43 are formed at an inner peripheral part of the ring gear 430.

A diameter of an addendum circle of the drive cam internal teeth 43 is larger than the diameter of the addendum circle of the secondary external teeth 322 of the planetary gear 32. Furthermore, the number of the drive cam internal teeth 43 is larger than the number of the secondary external teeth 322. The drive cam 40 is placed at an inside of the outer tubular portion 125 (serving as the tubular portion) of the housing 12 on a side of the ring gear 33, which is opposite to the stator 21, such that the drive cam internal teeth 43 of the ring gear 430 are meshed with the secondary external teeth 322 of the planetary gear 32. Therefore, when the planetary gear 32 is rotated and revolved at the inside of the ring gear 33 in response to rotation of the rotor 23 and the shaft 24, the drive cam 40 is rotated at the inside of the outer tubular portion 125 of the housing 12 relative to the outer tubular portion 125. As described above, the drive cam 40 has the drive cam grooves 400 formed at the one end surface 411 of the drive cam 40, and the drive cam 40 is configured to be rotated by the torque outputted from the speed reducer 30.

The speed reducer 30 reduces a rotational speed of rotation generated by the torque received from the electric motor 20 and outputs the torque of the rotation of the reduced rotational speed to the drive cam 40 through the ring gear 430 (serving as the output member). As described above, the speed reducer 30 is configured to reduce the rotational speed of the rotation generated by the torque received from the electric motor 20 and output the torque of the rotation of the reduced rotational speed. Here, a speed reduction ratio of the speed reducer 30 is set by appropriately setting the number of the primary external teeth 321 of the planetary gear 32 and the number of the internal teeth 331 of the ring gear 33. Generally, the efficiency of the speed reducer is higher as the speed reduction ratio is smaller.

A thrust bearing 161 is placed on the radially outer side of the ring gear 33 at a location that is between an outer peripheral part of the drive cam 40 and the outer bottom portion 124 of the housing 12. The thrust bearing 161 rotatably supports the drive cam 40 while the thrust bearing 161 receiving a load from the drive cam 40 in a thrust direction. Specifically, the thrust bearing 161 is placed between the outer bottom portion 124 (serving as the bottom portion) and the drive cam 40 and receives the load of the drive cam 40 in the axial direction.

Each of the balls 3 is shaped in a spherical form and is made of, for example, metal. The balls 3 serve as rolling elements. Each of the balls 3 is rotatably installed in a corresponding one of the drive cam grooves 400 (see FIG. 2). Specifically, the number of the balls 3 is three.

Figure 3:
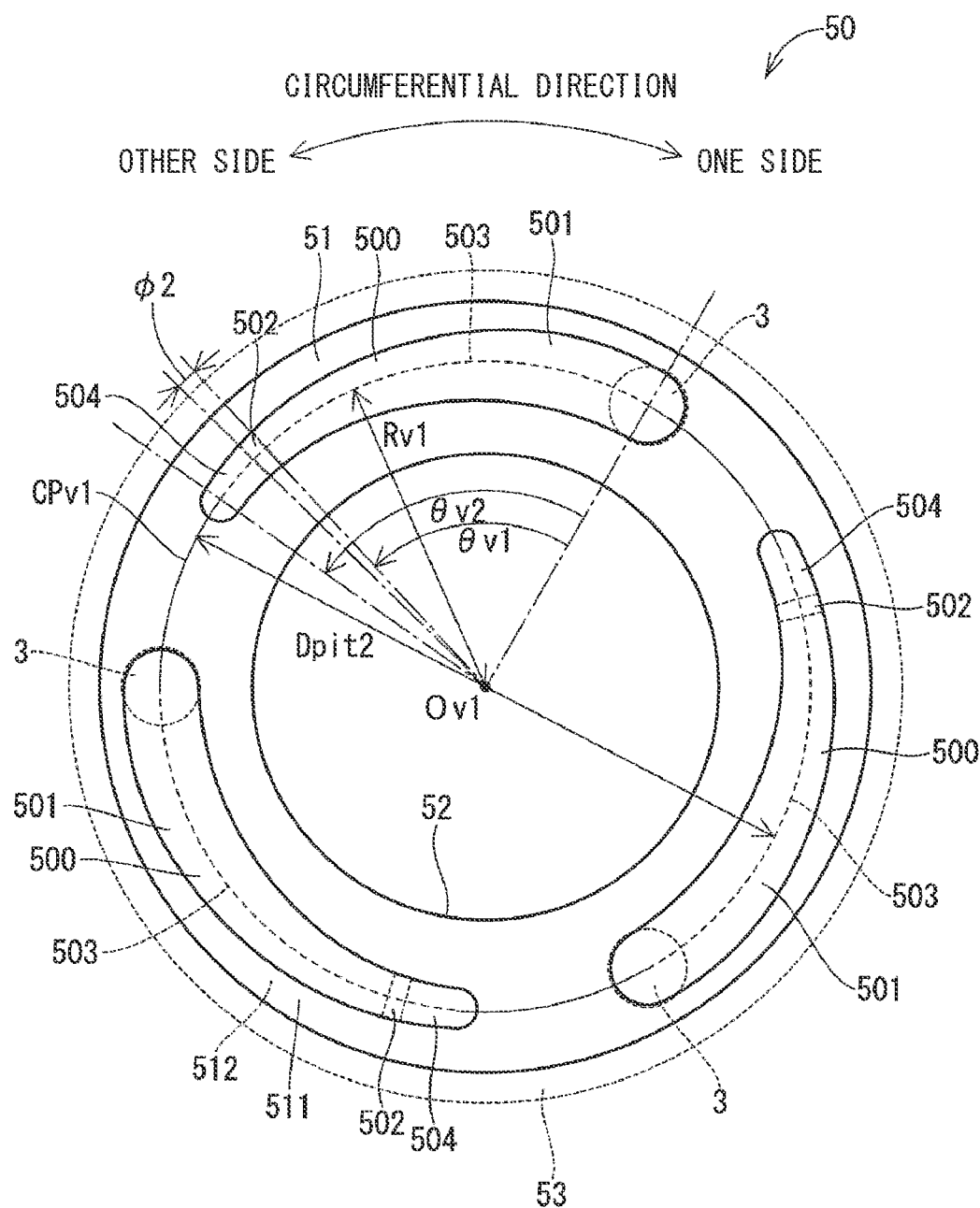
FIG. 3 is a diagram indicating a driven cam of the clutch device according to the first embodiment.

The driven cam 50 includes a driven cam main body 51, a driven cam hole 52, a plurality of spline coupling portions 53 and a plurality of driven cam grooves 500 (see FIG. 3). The driven cam main body 51 is shaped generally in a circular plate form and is made of, for example, metal. The driven cam hole 52 is shaped in a circular form and is coaxial with the driven cam main body 51 such that the driven cam hole 52 extends through a center of the driven cam main body 51. The spline coupling portions 53 are formed integrally with the driven cam main body 51 and are arranged at an outer peripheral part of the driven cam main body 51. The spline coupling portions 53 are arranged one after another in the circumferential direction of the driven cam main body 51 such that the spline coupling portions 53 extend from one end surface 511 of the driven cam main body 51 to the other end surface 512 of the driven cam main body 51 in the axial direction.

The driven cam grooves 500 are recessed from the one end surface 511 of the driven cam main body 51 toward the other end surface 512 of the driven cam main body 51 in the axial direction. Each of the driven cam grooves 500 is formed such that a depth of the driven cam groove 500 changes in a circumferential direction of the driven cam 50. The number of the driven cam grooves 500 is three, and these three driven cam grooves 500 are arranged one after another at equal intervals in the circumferential direction of the driven cam main body 51. Details of the driven cam grooves 500 will be described later.

The driven cam 50 is placed at the inside of the outer tubular portion 125 (serving as the tubular portion) of the housing 12 such that the spline coupling portions 53 of the driven cam 50 are spline-coupled to the spline grooves 126 of the housing 12. Therefore, the driven cam 50 is not rotatable relative to the outer tubular portion 125 of the housing 12 and is axially movable relative to the outer tubular portion 125 of the housing 12.

The driven cam 50 is located on a side of the drive cam 40, which is opposite to the ring gear 33, such that each of the balls 3 is clamped between the corresponding driven cam groove 500 of the driven cam 50 and the corresponding drive cam groove 400 of the drive cam 40, and thereby the driven cam 50 cooperates with the drive cam 40 and the balls 3 to form the ball cam 2. The ball cam 2 serves as the rolling element cam. The drive cam 40 is rotatable relative to the driven cam 50 and the housing 12. When the drive cam 40 is rotated relative to the driven cam 50, each ball 3 is rolled along a groove bottom 403 of the corresponding drive cam groove 400 and a groove bottom 503 of the corresponding driven cam groove 500.

As described above, each of the drive cam grooves 400 and each of the driven cam grooves 500 are formed such that the depth of the drive cam groove 400 and the depth of the driven cam groove 500 change in the circumferential direction of the drive cam 40 and the driven cam 50. Therefore, when the drive cam 40 is rotated relative to the driven cam 50 by the torque outputted from the speed reducer 30, each ball 3 is rolled along the corresponding drive cam groove 400 and the corresponding driven cam groove 500, and thereby the driven cam 50 is moved in the axial direction relative to the drive cam 40 and the housing 12.

As described above, the driven cam 50 has the driven cam grooves 500, which are formed at the one end surface 511 such that each ball 3 is clamped between the corresponding driven cam groove 500 and the corresponding drive cam groove 400, and the driven cam 50 cooperates with the drive cam 40 and the balls 3 to form the ball cam 2. Furthermore, when the relative rotation is made between the driven cam 50 and the drive cam 40, the driven cam 50 is moved in the axial direction relative to the drive cam 40.

The output shaft 62 includes a shaft portion 621, a plate portion 622, a tubular portion 623 and a friction plate 624. The shaft portion 621 is shaped generally in a cylindrical tubular form. The plate portion 622 is formed integrally with the shaft portion 621 in one-piece such that the plate portion 622 is shaped in a ring plate form and radially outwardly extends from one end of the shaft portion 621. The tubular portion 623 is formed integrally with the plate portion 622 in one-piece such that the tubular portion 623 is shaped generally in a cylindrical tubular form and extends from an outer peripheral part of the plate portion 622 toward a side that is opposite to the shaft portion 621. The friction plate 624 is shaped generally in a circular ring plate form and is installed to an end surface of the plate portion 622, which is located on a side where the tubular portion 623 is placed. Here, the friction plate 624 is not rotatable relative to the plate portion 622.

An end part of the input shaft 61 extends through the driven cam hole 52 and is located on a side of the driven cam 50, which is opposite to the drive cam 40. The output shaft 62 is coaxial with the input shaft 61 and is located on a side of the housing 12, which is opposite to the stationary flange 11, i.e., is located on a side of the driven cam 50, which is opposite to the drive cam 40. A bearing 142 is installed between an inner peripheral wall of the shaft portion 621 and an outer peripheral wall of the end part of the input shaft 61. Thereby, the output shaft 62 is rotatably supported by the input shaft 61 through the bearing 142.

The clutch 70 is located on the side of the driven cam 50, which is opposite to the drive cam 40. The clutch 70 includes a plurality of inner friction plates 71 and a plurality of outer friction plates 72. Each of the inner friction plates 71 is shaped generally in a circular ring plate form, and these inner friction plates 71 are located between the input shaft 61 and the tubular portion 623 of the output shaft 62 such that the inner friction plates 71 are arranged one after another in the axial direction. The inner friction plates 71 are installed such that inner peripheral parts of the inner friction plates 71 are spline-coupled to the outer peripheral wall of the input shaft 61. Therefore, the inner friction plates 71 are not rotatable relative to the input shaft 61 and are axially movable relative to the input shaft 61.

Each of the outer friction plates 72 is shaped generally in a circular ring plate form, and these outer friction plates 72 are located between the input shaft 61 and the tubular portion 623 of the output shaft 62 such that the outer friction plates 72 are arranged one after another in the axial direction. The inner friction plates 71 and the outer friction plates 72 are alternately arranged in the axial direction of the input shaft 61. The outer friction plates 72 are installed such that outer peripheral parts of the outer friction plates 72 are spline-coupled to the inner peripheral wall of the tubular portion 623 of the output shaft 62. Therefore, the outer friction plates 72 are not rotatable relative to the output shaft 62 and are axially movable relative to the output shaft 62. One of the outer friction plates 72, which is closest to the friction plate 624 among the outer friction plates 72, can contact the friction plate 624.

In a coupled state where the inner friction plates 71 and the outer friction plates 72 contact with each other, i.e., are coupled with each other, a frictional force is generated between each inner friction plate 71 and the adjacent outer friction plate 72, and relative rotation between the inner friction plate 71 and the adjacent outer friction plate 72 is limited according to the amount of this frictional force. In a decoupled state where the inner friction plates 71 and the outer friction plates 72 are spaced from each other, i.e., are decoupled from each other, the frictional force is not generated between each inner friction plate 71 and the adjacent outer friction plate 72, and the relative rotation between the inner friction plate 71 and the adjacent outer friction plate 72 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

As described above, the torque is transmitted between the output shaft 62 and the input shaft 61. In the coupled state of the clutch 70, the clutch 70 enables the transmission of the torque between the input shaft 61 and the output shaft 62. In the decoupled state of the clutch 70, the clutch 70 disables the transmission of the torque between the input shaft 61 and the output shaft 62.

In the present embodiment, the clutch device 1 is a normally open type clutch device that is normally placed in the decoupled state.

The piston 81 is shaped generally in a circular ring form and is placed between the driven cam 50 and the clutch 70 at a location that is on a radially outer side of the input shaft 61. A thrust bearing 162 is installed between the driven cam 50 and the piston 81. The thrust bearing 162 rotatably supports the piston 81 while the thrust bearing 162 receives a load in a thrust direction from the piston 81.

A return spring 82 and a retaining portion 83 are placed between the piston 81 and the clutch 70. The retaining portion 83 is shaped generally in a circular ring form, and an outer peripheral part of the retaining portion 83 is fitted to an inner peripheral wall of the tubular portion 623 of the output shaft 62. The retaining portion 83 can retain the outer peripheral part of the one of the outer friction plates 72, which is closest to the piston 81 among the outer friction plates 72. Therefore, removal of the outer friction plates 72 and the inner friction plates 71 from the inside of the tubular portion 623 is limited. A distance between the retaining portion 83 and the friction plate 624 is larger than a sum of the plate thicknesses of the outer friction plates 72 and the inner friction plates 71.

The return spring 82 is a coned-disc spring, and the return spring 82 is installed such that one end of the return spring 82 contacts the outer peripheral part of the piston 81, and the other end of the return spring 82 contacts the retaining portion 83. Thereby, the return spring 82 urges the piston 81 toward the driven cam 50.

As shown in FIGS. 1, 2 and 3, in a state where each of the balls 3 is placed at one end of the corresponding drive cam groove 400 and one end of the corresponding driven cam groove 500, a distance between the drive cam 40 and the driven cam 50 is relatively small, and a gap Sp1 is formed between the piston 81 and the outer friction plate 72 of the clutch 70 (see FIG. 1). Therefore, the clutch 70 is in the decoupled state, and the transmission of the torque between the input shaft 61 and the output shaft 62 is disabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled from the one end of the corresponding drive cam groove 400 and the one end of the corresponding driven cam groove 500 toward the other end of the corresponding drive cam groove 400 and the other end of the corresponding driven cam groove 500. As a result, the driven cam 50 is axially moved relative to the drive cam 40, i.e., is moved toward the clutch 70. In this way, the piston 81 is urged by the driven cam 50 and is moved toward the clutch 70 against the urging force of the return spring 82.

When the piston 81 is urged by the driven cam 50 and is moved toward the clutch 70, the size of the gap Sp1 is reduced, and thereby the piston 81 contacts the outer friction plate 72 of the clutch 70. When the driven cam 50 further urges the piston 81 after the occurrence of the contact of the piston 81 to the clutch 70, the inner friction plates 71 and the outer friction plates 72 are coupled with each other. Thus, the clutch 70 is placed in the coupled state. Thereby, the transmission of the torque between the input shaft 61 and the output shaft 62 is enabled.

When the clutch transmission torque reaches a required clutch torque capacity, the ECU 10 stops the rotation of the electric motor 20. In this way, the clutch 70 is placed in a coupling holding state for holding the clutch transmission torque at the required clutch torque capacity. As described above, the piston 81 can receive the axial force from the driven cam 50 to shift the operational state of the clutch 70 to the coupled state or the decoupled state depending on the relative position of the driven cam 50 relative to the drive cam 40 in the axial direction.

The clutch 70 is placed on the side of the driven cam 50, which is opposite to the drive cam 40, and the clutch 70 shifts to the coupled state or the decoupled state depending on the relative position of the driven cam 50 relative to the drive cam 40 in the axial direction.

An end part of the shaft portion 621 of the output shaft 62, which is opposite to the plate portion 622, is connected to an input shaft of the transmission (not shown) and is thereby rotatable integrally with the input shaft of the transmission. Specifically, the torque, which is outputted from the output shaft 62, is inputted to the input shaft of the transmission. When the torque is inputted to the input shaft of the transmission to cause rotation of the input shaft, a rotational speed of this rotation is changed at the transmission, and then this rotation is outputted to drive wheels of the vehicle to provide drive torque to the drive wheels. Thereby, the vehicle is driven.

As shown in FIG. 1, in the present embodiment, at least a part of each drive cam groove 400 overlaps with the speed reducer 30 in the axial direction of the drive cam 40.

Specifically, each drive cam groove 400 entirely overlaps with the ring gear 430 (serving as the output member), which is the portion of the speed reducer 30, in the axial direction of the drive cam 40. Thereby, the size of the clutch device 1, which is measured in the axial direction of the drive cam 40, can be reduced or minimized.

In the present embodiment, the speed reducer 30 further includes a limiting portion 34. The limiting portion 34 is formed integrally with the planetary gear 32 in one-piece such that the limiting portion 34 extends in a tubular form from an end surface of the planetary gear 32, which is axially located on the side where the clutch 70 is placed, toward the clutch 70 and thereafter extends in a ring form toward the radially inner side. A part of the limiting portion 34, which is in the tubular form, has an inner peripheral wall that is fitted to an outer peripheral wall of the bearing 154. Another part of the limiting portion 34, which is in the ring form, has a surface that is opposite to the clutch 70, and this surface can contact a surface of the bearing 154 located on the side where the clutch 70 is placed. Therefore, when the bearing 154 and the limiting portion 34 axially contact with each other, movement of the planetary gear 32 toward the electric motor 20 side is limited.

Here, each drive cam groove 400 entirely overlaps with the planetary gear 32 (the portion of the speed reducer 30), particularly with the secondary external teeth 322 of the planetary gear 32 in the axial direction of the drive cam 40.

Furthermore, an axial part of the limiting portion 34 of the speed reducer 30 is located on the radially inner side of the driven cam grooves 500 of the driven cam 50. Specifically, in the present embodiment, at least a portion of each driven cam groove 500 overlaps with the limiting portion 34 (the portion of the speed reducer 30) in the axial direction of the driven cam 50. Thereby, the size of the clutch device 1, which is measured in the axial direction of the drive cam 40 and the driven cam 50, can be reduced or minimized.

Next, the drive cam grooves 400 and the driven cam grooves 500 will be described in detail.

Each drive cam groove 400 has a drive cam slope groove 401, a drive cam planar groove 404 and a drive cam connection groove 402. At the drive cam slope groove 401, the groove bottom 403 is sloped relative to the one end surface 411 of the drive cam 40 such that a depth of the groove bottom 403 continuously decreases from one side toward the other side in the circumferential direction of the drive cam 40. At the drive cam planar groove 404, the groove bottom 403 is parallel to the one end surface 411 of the drive cam 40 such that the depth of the groove bottom 403 is constant in the circumferential direction of the drive cam 40. Specifically, a slope angle of the groove bottom 403 at the drive cam planar groove 404 relative to the one end surface 411 of the drive cam 40 is zero degrees. The drive cam connection groove 402 has: one end connected to an end of the drive cam slope groove 401 located on the other side in the circumferential direction of the drive cam 40; and another end connected to an end of the drive cam planar groove 404 located on the one side in the circumferential direction of the drive cam 40, and a slope angle of the groove bottom 403 relative to the one end surface 411 of the drive cam 40 continuously changes from the one end to the other end of the drive cam connection groove 402 (see FIG. 4).

Each driven cam groove 500 has a driven cam slope groove 501, a driven cam planar groove 504 and a driven cam connection groove 502. At the driven cam slope groove 501, the groove bottom 503 is sloped relative to the one end surface 511 of the driven cam 50 such that a depth of the groove bottom 503 continuously decreases from one side toward the other side in the circumferential direction of the driven cam 50. At the driven cam planar groove 504, the groove bottom 503 is parallel to the one end surface 511 of the driven cam 50 such that the depth of the groove bottom 503 is constant in the circumferential direction of the driven cam 50. Specifically, a slope angle of the groove bottom 503 at the driven cam planar groove 504 relative to the one end surface 511 of the driven cam 50 is zero degrees. The driven cam connection groove 502 has: one end connected to an end of the driven cam slope groove 501 located on the other side in the circumferential direction of the driven cam 50; and another end connected to an end of the driven cam planar groove 504 located on the one side in the circumferential direction of the driven cam 50, and a slope angle of the groove bottom 503 relative to the one end surface 511 of the driven cam 50 continuously changes from the one end to the other end of the driven cam connection groove 502 (see FIG. 4).

Figure 4:
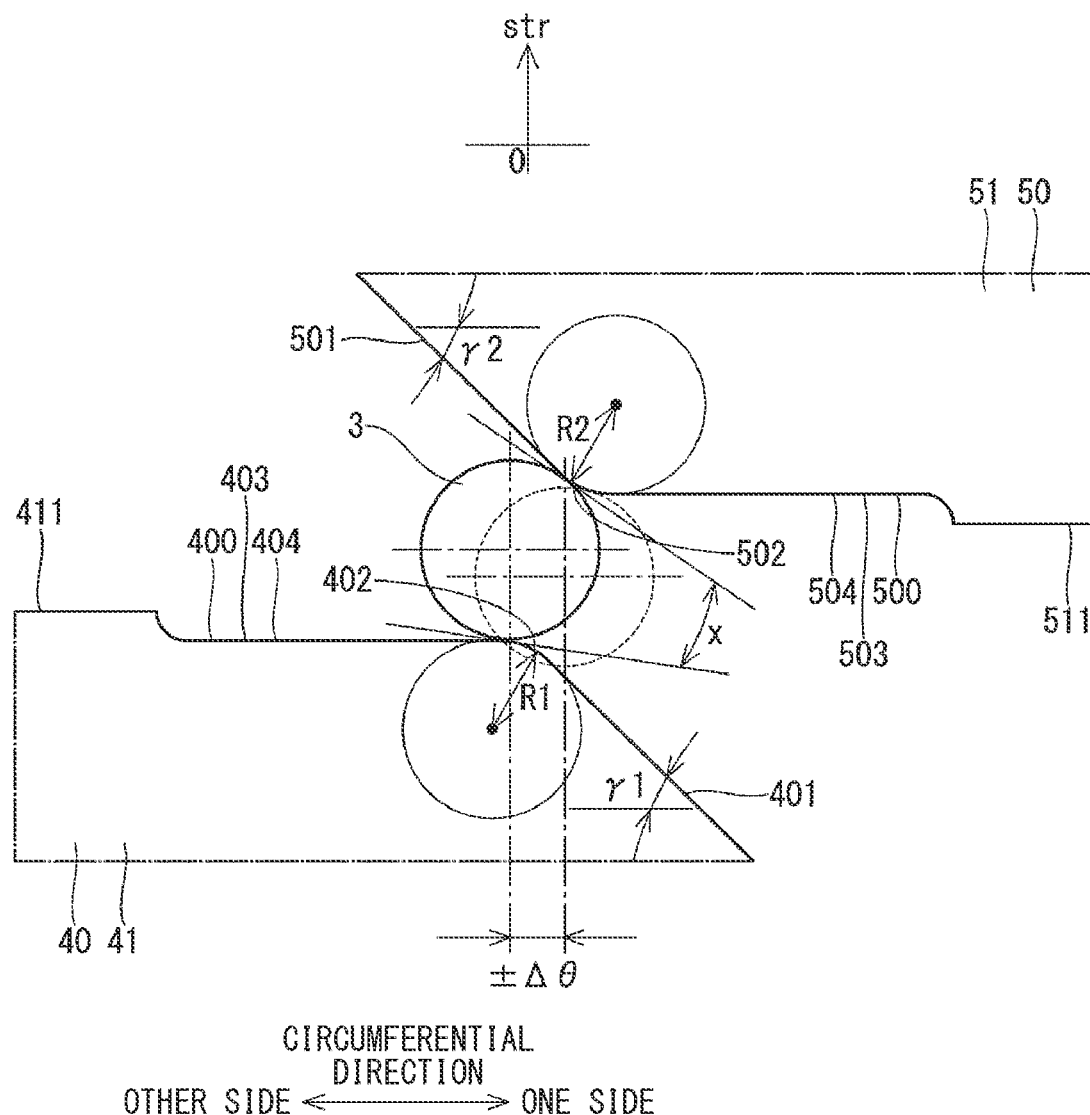
FIG. 4 is a cross-sectional view indicating a drive cam groove and a driven cam groove of the clutch device according to the first embodiment.

The drive cam connection groove 402 of each of the drive cam grooves 400 is formed such that in a curved cross section that extends along the groove bottom 403 of the drive cam groove 400 and is perpendicular to the one end surface 411 of the drive cam 40, the groove bottom 403 at the drive cam connection groove 402 extends along an arc that has a predetermined radius R1 (see FIG. 4).

The driven cam connection groove 502 of each of the driven cam grooves 500 is formed such that in a curved cross section that extends along the groove bottom 503 of the driven cam groove 500 and is perpendicular to the one end surface 511 of the driven cam 50, the groove bottom 503 at the driven cam connection groove 502 extends along an arc that has a predetermined radius R2 (see FIG. 4).

Figure 5:
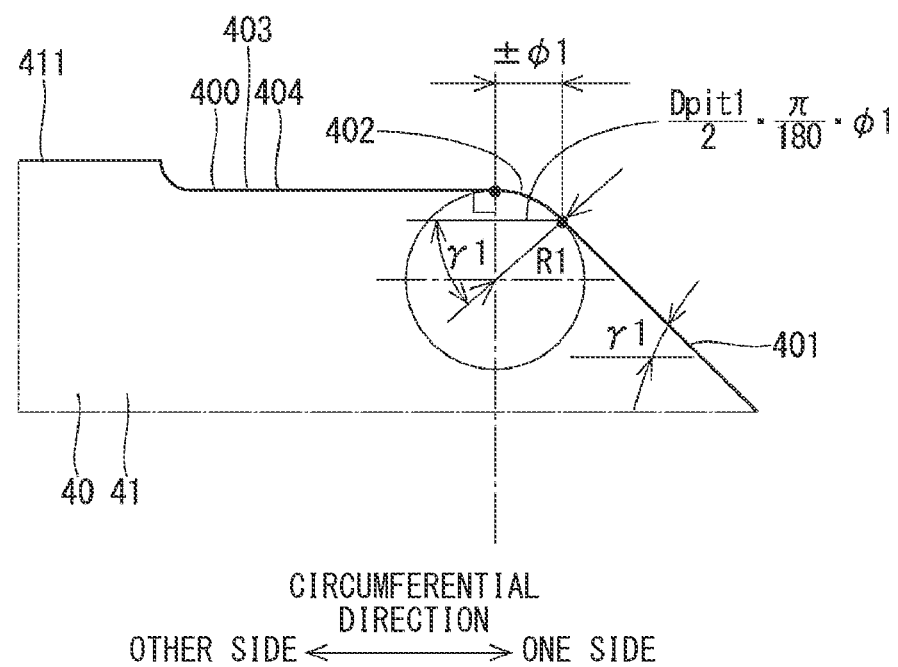
FIG. 5 is a cross-sectional view indicating the drive cam groove of the clutch device according to the first embodiment.

The drive cam connection groove 402 (see FIG. 5) in each of the drive cam grooves 400 is formed to satisfy an equation of $R1 = Dpit1/2 \cdot \pi/180 \cdot \varnothing 1/\cos \gamma 1$, where: Dpit1 denotes a diameter of a pitch circle CPd1, which is a circle that is centered at a center Od1 of the drive cam 40 and extends along the groove bottom 403 at the drive cam planar groove 404 in the drive cam groove 400; ø1 [deg.] denotes a circumferential angular extent of the drive cam connection groove 402 of the drive cam groove 400 measured in the circumferential direction of the drive cam 40; and γ1 denotes the slope angle of the groove bottom 403 at the drive cam slope groove 401 of the drive cam groove 400 relative to the one end surface 411 of the drive cam 40 (see FIGS. 2 and 4).

The driven cam connection groove 502 in each of the driven cam grooves 500 is formed to satisfy an equation of $R2 = Dpit2/2 \cdot \pi/180 \cdot \varnothing 2/\cos \gamma 2$, where: Dpit2 denotes a diameter of a pitch circle CPv1, which is a circle that is centered at a center Ov1 of the driven cam 50 and extends along the groove bottom 503 at the driven cam planar groove 504 in the driven cam groove 500; ø2 [deg.] denotes a circumferential angular extent of the driven cam connection groove 502 of the driven cam groove 500 measured in the circumferential direction of the driven cam 50; and γ2 denotes the slope angle of the groove bottom 503 at the driven cam slope groove 501 of the driven cam groove 500 relative to the one end surface 511 of the driven cam 50 (see FIGS. 3 and 4).

In the present embodiment, there is a relationship of $1 \leq \varnothing 1 \leq 6$. Specifically, the drive cam connection groove 402 has a circumferential angular extent ø1 that is in a range of 1 to 6 [deg.] in the circumferential direction of the drive cam 40.

Furthermore, there is a relationship of $1 \leq \varnothing 2 \leq 6$. Specifically, the driven cam connection groove 502 has a circumferential angular extent ø2 that is in a range of 1 to 6 [deg.] in the circumferential direction of the driven cam 50.

Each of the drive cam grooves 400 and each of the driven cam grooves 500 have an identical shape in a view taken from a side where the one end surface 411 of the drive cam 40 is placed or a side where the one end surface 511 of the driven cam 50 is placed (see FIGS. 2 and 3).

The drive cam grooves 400 do not intersect or connect with each other at the one end surface 411 of the drive cam 40 (see FIG. 2). The driven cam grooves 500 do not intersect or connect with each other at the one end surface 511 of the driven cam 50 (see FIG. 3).

Each of the drive cam grooves 400 is formed such that a distance Rd1, which is measured between the center Od1 of the drive cam 40 and the groove bottom 403, is constant along the drive cam groove 400 in the circumferential direction of the drive cam 40 (see FIG. 2). Each of the driven cam grooves 500 is formed such that a distance Rv1, which is measured between the center Ov1 of the driven cam 50 and the groove bottom 503, is constant along the driven cam groove 500 in the circumferential direction of the driven cam 50 (see FIG. 3).

In the present embodiment, when the ECU 10 executes the control operation to shift the operational state of the clutch 70 from the decoupled state to the coupled state, the ECU 10 controls the operation of the electric motor 20 to rotate the drive cam 40 such that each ball 3 is rolled from the one end of the drive cam slope groove 401 and the one end of the driven cam slope groove 501 toward the drive cam planar groove 404 and the driven cam planar groove 504. At this time, the ball 3 is rolled to pass through the drive cam connection groove 402 and the driven cam connection groove 502 and reach the drive cam planar groove 404 and the driven cam planar groove 504.

In the state where the ball 3 is placed at the drive cam planar groove 404 and the driven cam planar groove 504, even when an axial reaction force is applied from the clutch 70, which is in the coupled state, to the driven cam 50, the ball 3 is not rolled. Therefore, the drive cam 40 is not rotated relative to the driven cam 50. Specifically, a reverse efficiency of the ball cam 2 becomes equal to or smaller than 0 (zero). Thus, even when the energization of the electric motor 20 is stopped at this time, the clutch 70 can be kept in the coupled state. Therefore, the electric power consumption of the clutch device 1 can be reduced.

Next, the effects and advantages, which are achieved by the structure of the ball cam 2 of the present embodiment, will be described in comparison to a comparative example.

Figure 6:
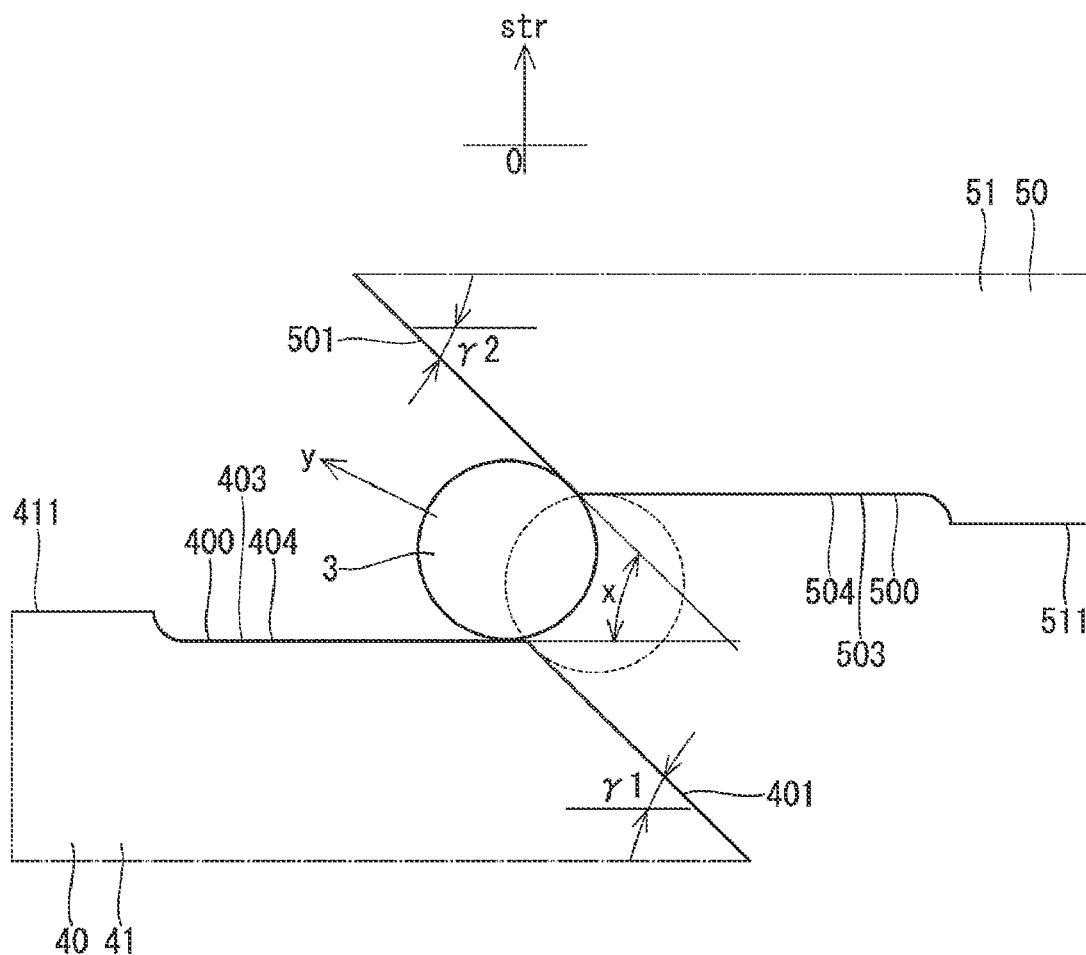
FIG. 6 is a cross-sectional view indicating a drive cam groove and a driven cam groove of a clutch device of a comparative example.

As shown in FIG. 6, in a ball cam of a comparative example, each of the drive cam grooves 400 does not have the drive cam connection groove 402, and each of the driven cam grooves 500 does not have the driven cam connection groove 502. Therefore, the drive cam slope groove 401 and the drive cam planar groove 404 are directly connected together, and the driven cam slope groove 501 and the driven cam planar groove 504 are directly connected together. Thus, a connection between the drive cam slope groove 401 and the drive cam planar groove 404 and a connection between the driven cam slope groove 501 and the driven cam planar groove 504 respectively form a sharp corner having an edge.

In general, due to manufacturing variations of the drive cam 40 and the driven cam 50, the timing, at which the ball 3 moves from the drive cam slope groove 401 to the drive cam planar groove 404, and the timing, at which the ball 3 moves from the driven cam slope groove 501 to the driven cam planar groove 504, are different from each other. As described above, in the ball cam of the comparative example, in the curved cross section that extends along the groove bottom 403 of the drive cam groove 400 and the groove bottom 503 of the driven cam groove 500 and is perpendicular to the one end surface 411 of the drive cam 40 or the one end surface 511 of the driven cam 50 (see FIG. 6), the connection between the drive cam slope groove 401 and the drive cam planar groove 404 and the connection between the driven cam slope groove 501 and the driven cam planar groove 504 respectively form the sharp corner having the edge.

Therefore, the timing, at which the ball 3 moves from the drive cam slope groove 401 to the drive cam planar groove 404, and the timing, at which the ball 3 moves from the driven cam slope groove 501 to the driven cam planar groove 504, deviate from each other, and thereby a clamp angle x of the ball 3, which is an angle of clamping the ball 3 between the drive cam 40 and the driven cam 50, rapidly changes. The clamp angle x corresponds to the slope angle $\gamma 1$ or the slope angle $\gamma 2$. At this time, a force acts on the ball 3 in a direction y, in which the ball 3 is moved away from the drive cam groove 400 or the driven cam groove 500, according to the clamp angle x. In a case where this force is larger than a static frictional force generated between the ball 3 and the drive cam groove 400 and the driven cam groove 500, the ball 3 cannot stay stationary in the drive cam groove 400 and the driven cam groove 500 and is slipped in the direction y, in which the force is applied to the ball 3. This is a phenomenon called popping. When the popping occurs, the amount of stroke of the driven cam 50, which is a change in the relative position of the driven cam 50 relative to the drive cam 40 in the axial direction, deviates from a desired value, and an urging force, which urges the driven cam 50 in the axial direction, is reduced.

Figure 7:
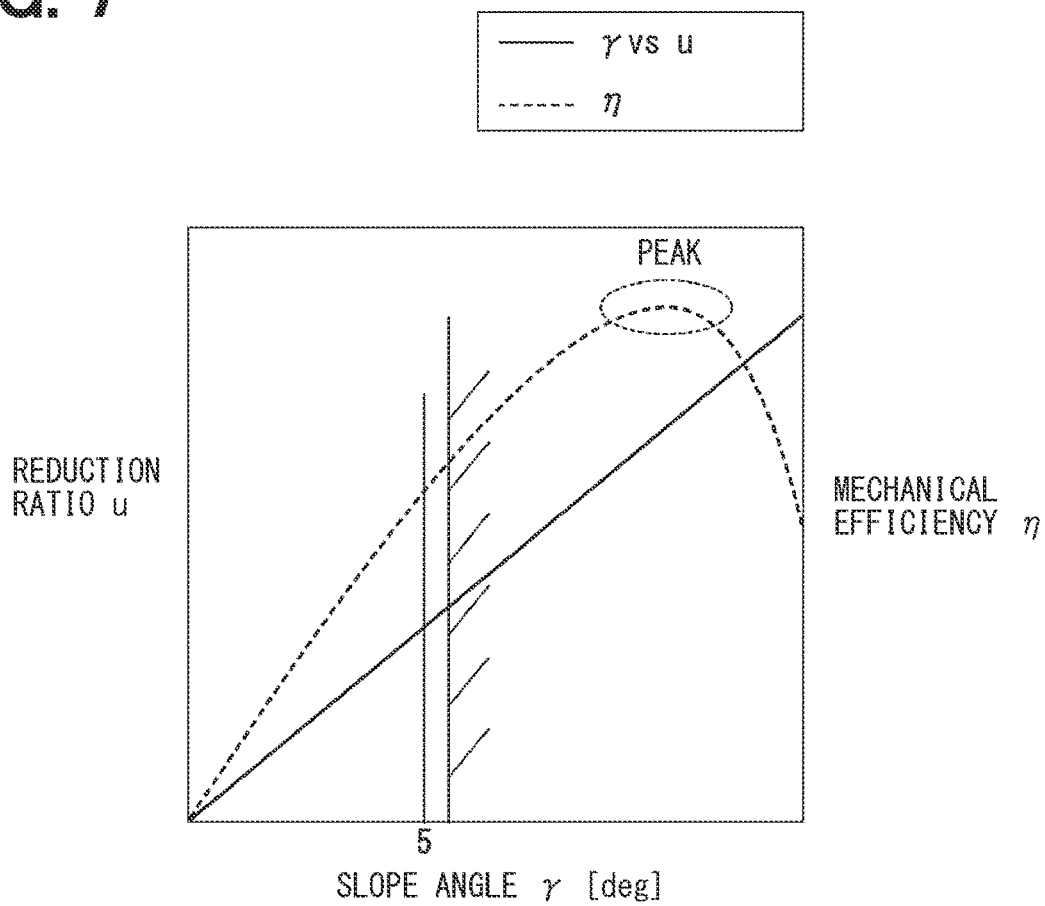
FIG. 7 is a diagram indicating a relationship among a slope angle, a reduction ratio and a mechanical efficiency in the clutch device.

In the comparative example, a condition, which limits the occurrence of the popping, is expressed by $\sin \gamma/(\cos \gamma+1)<\mu$ where $\gamma$ denotes the slope angle of the drive cam slope groove 401 and the driven cam slope groove 501, and $\mu$ denotes a static friction coefficient. Here, the static friction coefficient $\mu$ between the ball 3 and the drive cam groove 400 and the driven cam groove 500 is considered to be about 0.05 to 0.1 in consideration of the boundary lubrication state. Therefore, when the static friction coefficient $\mu$ is a lower limit value ($\mu=0.05$), there is $\gamma<5.73$ [deg.], and the degree of design freedom is reduced. This makes it impossible to select the optimum specifications for the mechanical efficiency n of the clutch device (see FIG. 7). Therefore, the size of the electric motor 20 may possibly be increased, that is, the size of the clutch device may possibly be increased.

In contrast, in the ball cam 2 of the present embodiment, it is assumed that due to an angular dimension error in processing of the ball cam 2, a phase shift $\pm\Delta\theta$ [deg.] is generated, and the clamp angle x [deg.] is generated. Here, the drive cam connection groove 402 and the driven cam connection groove 502 are set to satisfy |x|<5.73 [deg.] even when the phase is deviated by an assumed amount, i.e., $\pm\Delta\theta$.

Specifically, in the present embodiment, the drive cam connection groove 402 is formed to satisfy an equation of $R1=Dpit1/2\cdot\pi/180\cdot\emptyset1/\cos \gamma 1$, and the driven cam connection groove 502 is formed to satisfy an equation of $R2=Dpit2/2\cdot\pi/180\cdot\emptyset2/\cos \gamma 2$. Here, in a case of setting Dpit1=50 [mm], Dpit2=50 [mm], $\emptyset1=1$ [deg.], $\emptyset2=1$ [deg.], $\gamma1=10$ [deg.] and $\gamma2=10$ [deg.], it will result in R1=0.44 [mm] and R2=0.44 [mm].

In the present embodiment, the occurrence of the popping is limited by forming the drive cam connection groove 402 and the driven cam connection groove 502 in the above-described manner.

Thus, in the comparative example, the connection between the drive cam slope groove 401 and the drive cam planar groove 404 and the connection between the driven cam slope groove 501 and the driven cam planar groove 504 respectively form the sharp corner (R≈0). Therefore, the clamp angle x becomes the slope angle γ of the drive cam slope groove 401 and of the driven cam slope groove 501. Therefore, in order to limit the occurrence of the popping in the comparative example, it is required to set γ<5.73 [deg.].

In the present embodiment, by forming the drive cam connection groove 402 and the driven cam connection groove 502 in the above-described manner, the occurrence of the popping is limited, and the restrictions on the slope angle γ1 of the drive cam slope groove 401 and the slope angle γ2 of the driven cam slope groove 501 can be greatly relaxed.

Figure 8:
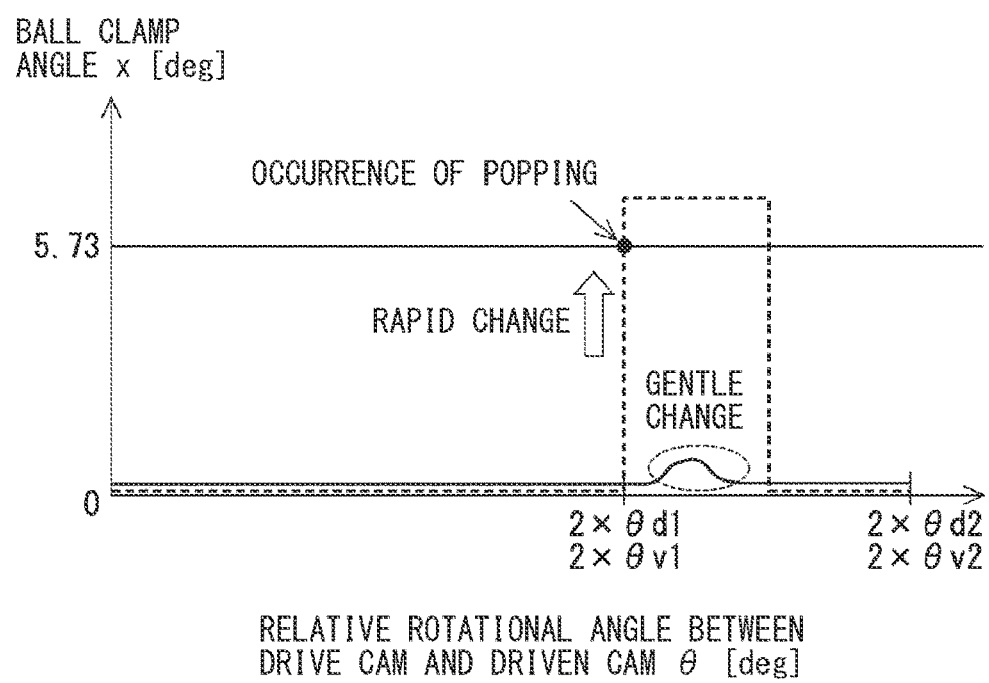
FIG. 8 is a diagram indicating a relationship between: a relative rotational angle between the drive cam and the driven cam; and a clamp angle of a rolling element in the first embodiment and the comparative example.

FIG. 8 shows a relationship between the clamp angle x [deg.] of the ball 3 and a relative rotational angle θ [deg.] between the drive cam 40 and the driven cam 50 in each of the present embodiment and the comparative example. Furthermore, FIG. 9 indicates a relationship between a driven cam stroke str [mm], which is the amount of movement of the driven cam 50 relative to the drive cam 40 in the axial direction, and a relative rotational angle θ [deg.] between the drive cam 40 and the driven cam 50 in each of the present embodiment and the comparative example.

Figure 9:
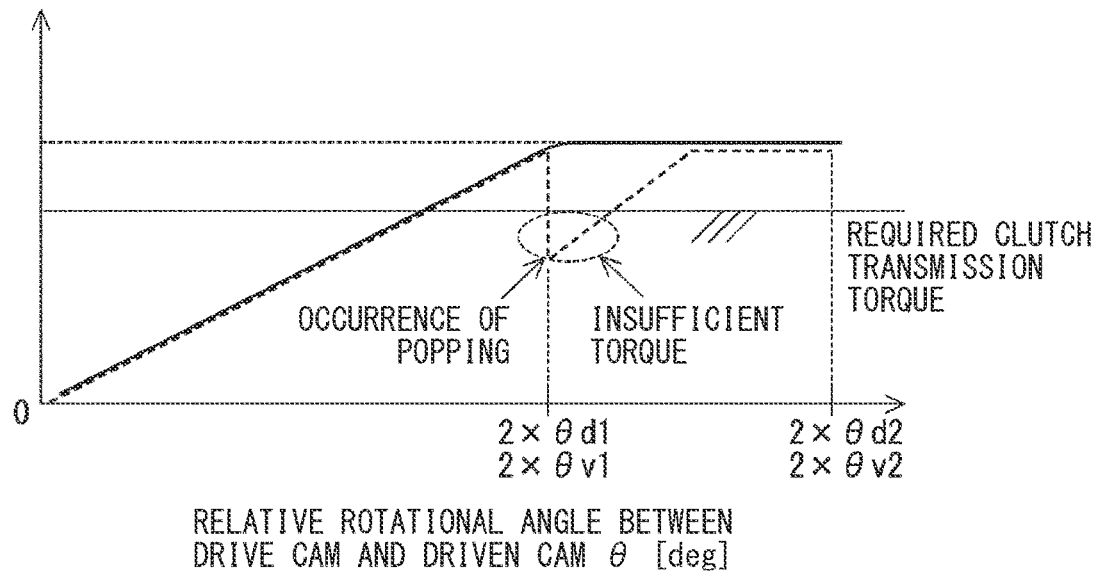
FIG. 9 is a diagram indicating a relationship between: a relative rotational angle between the drive cam and the driven cam; and the amount of displacement of the driven cam relative to the drive cam in the first embodiment and the comparative example.

In FIGS. 8 and 9, the present embodiment is indicated by a solid line, and the comparative example is indicated by a dotted line. In the comparative example, the connection between the drive cam slope groove 401 and the drive cam planar groove 404 and the connection between the driven cam slope groove 501 and the driven cam planar groove 504 respectively form the sharp corner (R≈0), and the slope angle γ of each of the drive cam slope groove 401 and the driven cam slope groove 501 is larger than 5.73 [deg.].

Furthermore, in FIGS. 8 and 9, θd1 corresponds to a circumferential angular extent measured from the one end of the drive cam slope groove 401 to the one end of the drive cam connection groove 402 in the present embodiment and corresponds to a circumferential angular extent measured from the one end of the drive cam slope groove 401 to the one end of the drive cam planar groove 404 in the comparative example, and θv1 corresponds to a circumferential angular extent measured from the one end of the driven cam slope groove 501 to the one end of the driven cam connection groove 502 in the present embodiment and corresponds to a circumferential angular extent measured from the one end of the driven cam slope groove 501 to the one end of the driven cam planar groove 504 in the comparative example.

Furthermore, in FIGS. 8 and 9, θd2 corresponds to a circumferential angular extent measured from the one end of the drive cam slope groove 401 to the other end of the drive cam planar groove 404 in the present embodiment and corresponds to a circumferential angular extent measured from the one end of the drive cam slope groove 401 to the other end of the drive cam planar groove 404 in the comparative example, and θv2 corresponds to a circumferential angular extent measured from the one end of the driven cam slope groove 501 to the other end of the driven cam planar groove 504 in the present embodiment and corresponds to a circumferential angular extent measured from the one end of the driven cam slope groove 501 to the other end of the driven cam planar groove 504 in the comparative example.

As shown in FIG. 8, in the present embodiment, when the ball 3 passes through the drive cam connection groove 402 at the time of increasing the relative rotational angle between the drive cam 40 and the driven cam 50 beyond 2×θd1 or 2×θv1, the clamp angle x of the ball 3 gently changes. Thus, the popping does not occur, and it is possible to limit a decrease in the driven cam stroke at the time when the ball 3 passes through the drive cam connection groove 402 (see FIG. 9).

In contrast, as shown in FIG. 8, in the comparative example, when the ball 3 passes through the connection between the drive cam slope groove 401 and the drive cam planar groove 404 or the connection between the driven cam slope groove 501 and the driven cam planar groove 504 at the time of increasing the relative rotational angle between the drive cam 40 and the driven cam 50 beyond 2×θd1 or 2×θv1, the clamp angle x of the ball 3 rapidly changes and is increased beyond 5.73 [deg.]. Thus, the popping occurs, and the transmission torque, which is proportional to the driven cam stroke, becomes smaller than the required clutch transmission torque, and thereby the torque becomes insufficient (see FIG. 9).

Furthermore, in the comparative example, the connection between the drive cam slope groove 401 and the drive cam planar groove 404 and the connection between the driven cam slope groove 501 and the driven cam planar groove 504 respectively form the sharp corner having the edge. Therefore, when the ball 3 passes through the connection between the drive cam slope groove 401 and the drive cam planar groove 404 or the connection between the driven cam slope groove 501 and the driven cam planar groove 504, a surface pressure, which is applied from the ball 3 to the groove bottom 403 of the drive cam groove 400 or the groove bottom 503 of the driven cam groove 500 may possibly become excessively large. Thereby, an indentation may possibly be generated at the groove bottom 403 or the groove bottom 503, and a fatigue life may possibly be reduced.

In contrast, in the present embodiment, the drive cam connection groove 402, at which the slope angle continuously changes, is located between the drive cam slope groove 401 and the drive cam planar groove 404, and the driven cam connection groove 502, at which the slope angle continuously changes, is located between the driven cam slope groove 501 and the driven cam planar groove 504. Therefore, when the ball 3 passes through the drive cam connection groove 402 or the driven cam connection groove 502, the surface pressure, which is applied from the ball 3 to the groove bottom 403 of the drive cam groove 400 or the groove bottom 503 of the driven cam groove 500, can be reduced. Thereby, it is possible to limit the generation of the indentation at the groove bottom 403 or the groove bottom 503 and the reduction of the fatigue life.

As described above, in the present embodiment, each drive cam groove 400 has the drive cam slope groove 401, the drive cam planar groove 404 and the drive cam connection groove 402. At the drive cam slope groove 401, the groove bottom 403 is sloped relative to the one end surface 411 of the drive cam 40 such that the depth of the groove bottom 403 continuously decreases from the one side toward the other side in the circumferential direction of the drive cam 40. At the drive cam planar groove 404, the groove bottom 403 is parallel to the one end surface 411 of the drive cam 40 such that the depth of the groove bottom 403 is constant in the circumferential direction of the drive cam 40. The drive cam connection groove 402 has: the one end connected to the end of the drive cam slope groove 401 located on the other side in the circumferential direction of the drive cam 40; and the other end connected to the end of the drive cam planar groove 404 located on the one side in the circumferential direction of the drive cam 40, and the slope angle of the groove bottom 403 relative to the one end surface 411 of the drive cam 40 continuously changes from the one end to the other end of the drive cam connection groove 402.

Each driven cam groove 500 has the driven cam slope groove 501, the driven cam planar groove 504 and the driven cam connection groove 502. At the driven cam slope groove 501, the groove bottom 503 is sloped relative to the one end surface 511 of the driven cam 50 such that the depth of the groove bottom 503 continuously decreases from the one side toward the other side in the circumferential direction of the driven cam 50. At the driven cam planar groove 504, the groove bottom 503 is parallel to the one end surface 511 of the driven cam 50 such that the depth of the groove bottom 503 is constant in the circumferential direction of the driven cam 50. The driven cam connection groove 502 has: the one end connected to the end of the driven cam slope groove 501 located on the other side in the circumferential direction of the driven cam 50; and the other end connected to the end of the driven cam planar groove 504 located on the one side in the circumferential direction of the driven cam 50, and the slope angle of the groove bottom 503 relative to the one end surface 511 of the driven cam 50 continuously changes from the one end to the other end of the driven cam connection groove 502.

In the present embodiment, when the ball 3 is located at the drive cam planar groove 404 and the driven cam planar groove 504, the supply of the electric power to the electric motor 20 can be cut to reduce the electric power consumption. Furthermore, in the present embodiment, the drive cam groove 400 has the drive cam connection groove 402, and the driven cam groove 500 has the driven cam connection groove 502. Therefore, when the ball 3 moves from the drive cam slope groove 401 and the driven cam slope groove 501 to the drive cam planar groove 404 and the driven cam planar groove 504, it is possible to gently change the clamp angle of the ball 3 and to reduce the amount of change in the clamp angle of the ball 3. Thus, the occurrence of the popping can be limited. As a result, the degree of the design freedom of the drive cam grooves 400 and the driven cam grooves 500 can be increased, and the size of the electric motor 20 and the size of the ball cam 2 can be reduced. Thus, the size of the clutch device 1, at which the ball cam 2 is applied, can be reduced.

Furthermore, in the present embodiment, the drive cam connection groove 402 of each drive cam groove 400 is formed such that in the cross section that extends along the groove bottom 403 of the drive cam groove 400 and is perpendicular to the one end surface 411 of the drive cam 40, the groove bottom 403 at the drive cam connection groove 402 extends along the arc that has the predetermined radius R1.

The driven cam connection groove 502 of each driven cam groove 500 is formed such that in the cross section that extends along the groove bottom 503 of the driven cam groove 500 and is perpendicular to the one end surface 511 of the driven cam 50, the groove bottom 503 at the driven cam connection groove 502 extends along the arc that has the predetermined radius R2.

Therefore, when the ball 3 moves from the drive cam slope groove 401 and the driven cam slope groove 501 to the drive cam planar groove 404 and the driven cam planar groove 504, it is possible to further gently change the clamp angle of the ball 3 and to further reduce the amount of change in the clamp angle of the ball 3.

Furthermore, in the present embodiment, the drive cam connection groove 402 in each of the drive cam grooves 400 is formed to satisfy the equation of $R1 = Dpit1/2 \cdot \pi/180 \cdot \varnothing 1/\cos \gamma 1$, where: Dpit1 denotes the diameter of the pitch circle CPd1, which is the circle that is centered at the center Od1 of the drive cam 40 and extends along the groove bottom 403 at the drive cam planar groove 404 in the drive cam groove 400; ø1 [deg.] denotes the circumferential angular extent of the drive cam connection groove 402 of the drive cam groove 400 measured in the circumferential direction of the drive cam 40; and γ1 denotes the slope angle of the groove bottom 403 at the drive cam slope groove 401 of the drive cam groove 400 relative to the one end surface 411 of the drive cam 40.

The driven cam connection groove 502 in each of the driven cam grooves 500 is formed to satisfy the equation of $R2 = Dpit2/2 \cdot \pi/180 \cdot \varnothing 2/\cos \gamma 2$, where: Dpit2 denotes the diameter of the pitch circle CPv1, which is the circle that is centered at the center Ov1 of the driven cam 50 and extends along the groove bottom 503 at the driven cam planar groove 504 in the driven cam groove 500; ø2 [deg.] denotes the circumferential angular extent of the driven cam connection groove 502 of the driven cam groove 500 measured in the circumferential direction of the driven cam 50; and γ2 denotes the slope angle of the groove bottom 503 at the driven cam slope groove 501 of the driven cam groove 500 relative to the one end surface 511 of the driven cam 50.

Therefore, when the ball 3 moves from the drive cam slope groove 401 and the driven cam slope groove 501 to the drive cam planar groove 404 and the driven cam planar groove 504, it is possible to gently change the clamp angle of the ball 3 and to reduce the amount of change in the clamp angle of the ball 3 in a reliable manner.

Furthermore, in the present embodiment, the drive cam connection groove 402 has the circumferential angular extent ø1 that is in the range of 1 to 6 [deg.] in the circumferential direction of the drive cam 40.

The driven cam connection groove 502 has the circumferential angular extent ø2 that is in the range of 1 to 6 [deg.] in the circumferential direction of the driven cam 50.

Therefore, when the ball 3 moves from the drive cam slope groove 401 and the driven cam slope groove 501 to the drive cam planar groove 404 and the driven cam planar groove 504, it is possible to gently change the clamp angle of the ball 3 and to reduce the amount of change in the clamp angle of the ball 3 in a reliable manner. Furthermore, the circumferential angular extents ø1, ø2 are respectively set in the range of 1 to 6 [deg.], and thereby the size of the ball cam 2 can be reduced.

Furthermore, in the present embodiment, the drive cam groove 400 and the driven cam groove 500 have the identical shape in the view taken from the side where the one end surface 411 of the drive cam 40 is placed or the side where the one end surface 511 of the driven cam 50 is placed.

Therefore, in the state where the ball 3 is clamped between the drive cam groove 400 and the driven cam groove 500, the relative rotation between the drive cam 40 and the driven cam 50 can be smoothened. Thereby, it is possible to limit the decrease in the efficiency of the ball cam 2 and malfunction of the ball cam 2.

Furthermore, in the present embodiment, the drive cam grooves 400 do not intersect or connect with each other at the one end surface 411 of the drive cam 40. The driven cam grooves 500 do not intersect or connect with each other at the one end surface 511 of the driven cam 50.

Thereby, it is possible to limit the movement of the ball 3 to another one of the drive cam grooves 400 or another one of the driven cam grooves 500.

Furthermore, the clutch device 1 of the present embodiment includes: the input shaft 61, which serves as the first transmitter; the electric motor 20, which serves as the drive device; the ball cam 2, which serves as the rolling element cam; the output shaft 62, which serves as the second transmitter; and the clutch 70.

As described above, the ball cam 2 can limit the occurrence of the popping. As a result, the degree of the design freedom of the drive cam grooves 400 and the driven cam grooves 500 can be increased, and the size of the electric motor 20 and the size of the ball cam 2 can be reduced. Thus, the size of the clutch device 1, at which the ball cam 2 is applied, can be reduced.

Second Embodiment

Figure 10:
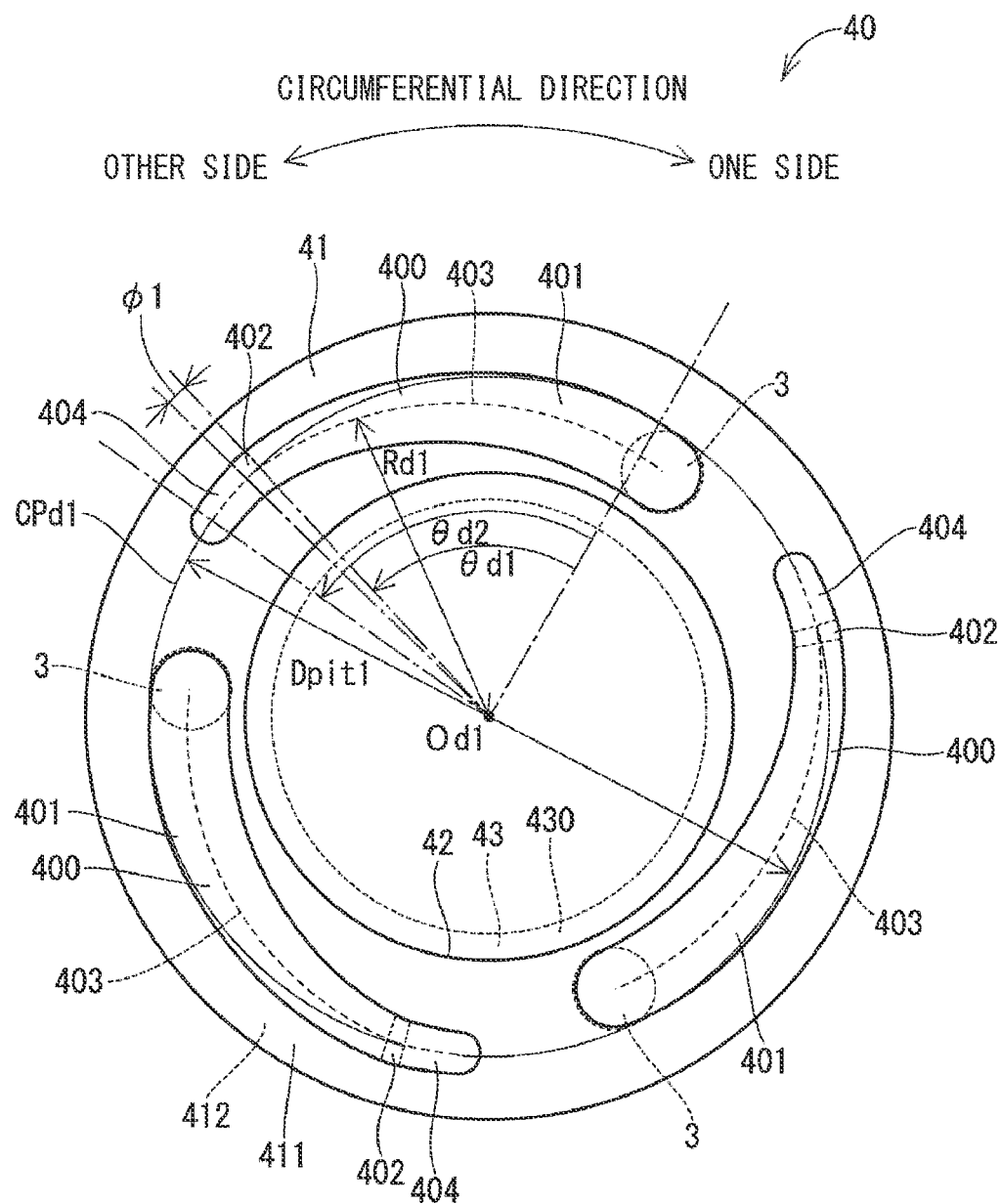
FIG. 10 is a diagram indicating a drive cam of a clutch device according to a second embodiment.
Figure 11:
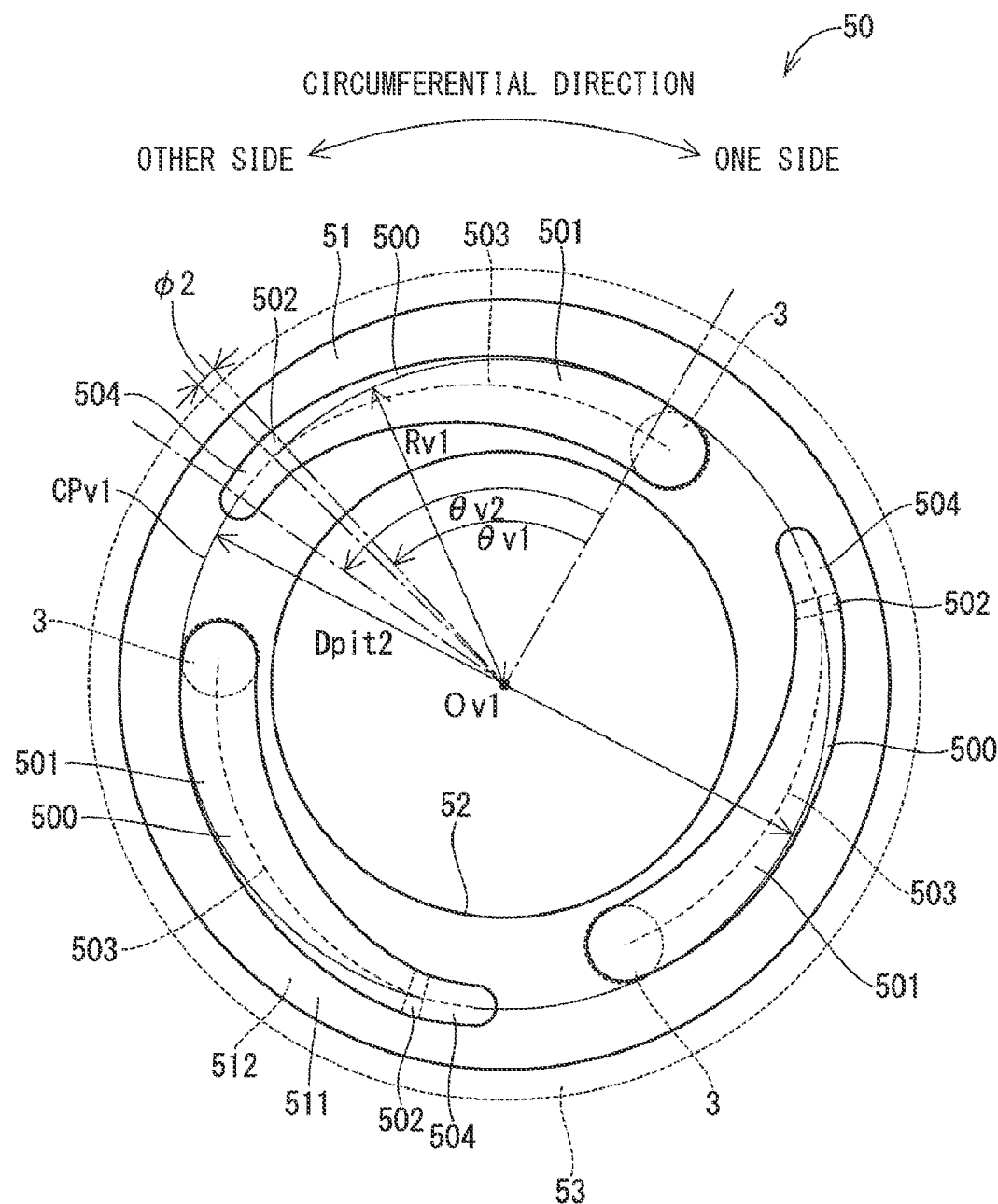
FIG. 11 is a diagram indicating a driven cam of the clutch device according to the second embodiment.

FIGS. 10 and 11 indicate a rolling element cam according to a second embodiment. The second embodiment differs from the first embodiment with respect to the configurations of the drive cam 40 and the driven cam 50.

As shown in FIG. 10, in the present embodiment, the drive cam slope groove 401 in each of the drive cam grooves 400 is formed such that the distance Rd1 between the center Od1 of the drive cam 40 and the groove bottom 403 at the drive cam slope groove 401 continuously changes from the one side toward the other side in the circumferential direction of the drive cam 40. Specifically, the drive cam slope groove 401 in each of the drive cam grooves 400 is formed such that the distance Rd1 between the center Od1 of the drive cam 40 and the groove bottom 403 at the drive cam slope groove 401 continuously increases from the one side toward the other side in the circumferential direction of the drive cam 40.

As shown in FIG. 11, the driven cam slope groove 501 in each of the driven cam grooves 500 is formed such that the distance Rv1 between the center Ov1 of the driven cam 50 and the groove bottom 503 at the driven cam slope groove 501 continuously changes from the one side toward the other side in the circumferential direction of the driven cam 50. Specifically, the driven cam slope groove 501 in each of the driven cam grooves 500 is formed such that the distance Rv1 between the center Ov1 of the driven cam 50 and the groove bottom 503 at the driven cam slope groove 501 continuously increases from the one side toward the other side in the circumferential direction of the driven cam 50.

With the above configurations, even when the circumferential length of the drive cam groove 400 measured in the circumferential direction of the drive cam 40 and the circumferential length of the driven cam groove 500 measured in the circumferential direction of the driven cam 50 are increased, it is possible to limit occurrence of connecting between each adjacent two of the drive cam grooves 400 and occurrence of connecting between each adjacent two of the driven cam grooves 500.

Thus, the circumferential length of the drive cam slope groove 401 of each drive cam groove 400 measured in the circumferential direction of the drive cam 40 and the circumferential length of the driven cam slope groove 501 of each driven cam groove 500 measured in the circumferential direction of the driven cam 50 can be easily increased. Thereby, the slope angle of the groove bottom 403 of the drive cam slope groove 401 and the slope angle of the groove bottom 503 of the driven cam slope groove 501 can be decreased while ensuring the required amount of axial movement of the driven cam 50 relative to the drive cam 40 relative to the relative rotational angle difference between the drive cam 40 and the driven cam 50. As a result, the required maximum torque of the electric motor 20 can be reduced, and the size of the electric motor 20 can be reduced. Thus, the size of the clutch device 1 can be further reduced.

Third Embodiment

FIGS. 12 to 17 indicate a portion of a clutch device and a portion of a rolling element cam according to a third embodiment. The third embodiment differs from the first embodiment with respect to the configurations of the electric motor 20, the drive cam 40 and the driven cam 50.

Figure 12:
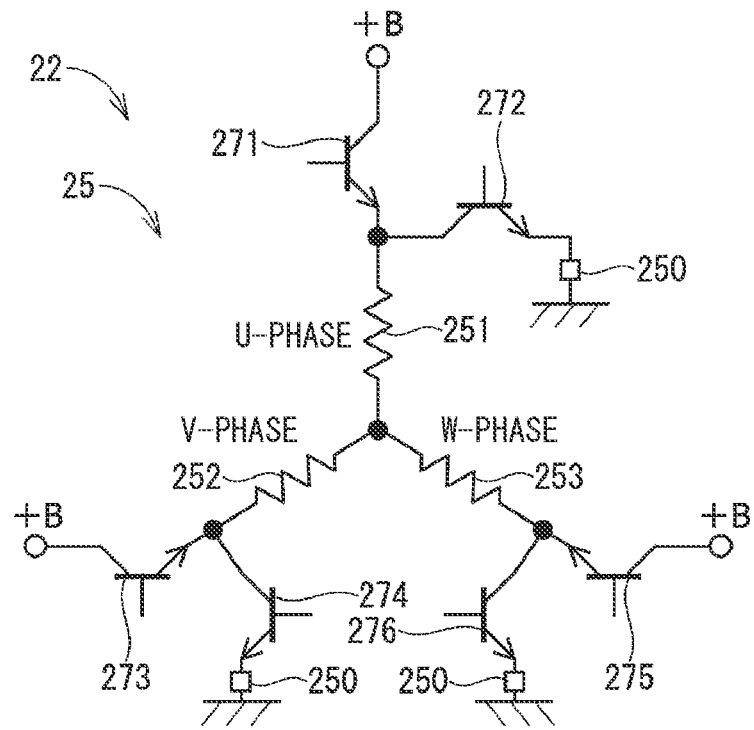
FIG. 12 is a schematic diagram indicating winding sets of a drive device of a clutch device according to a third embodiment.
Figure 12:
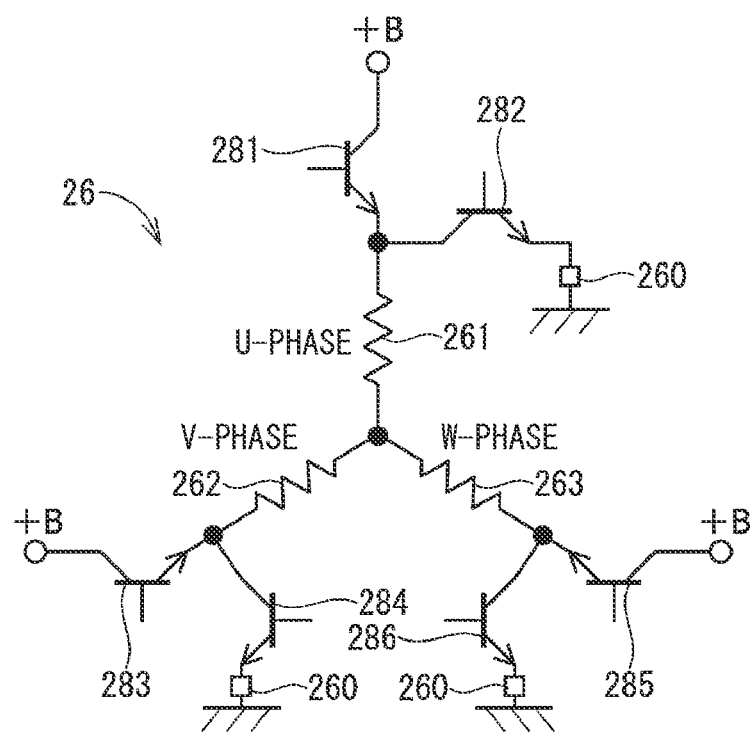

In the present embodiment, the coil 22 has two winding sets 25, 26 (see FIG. 12). The winding set 25 includes a U-phase winding 251, a V-phase winding 252 and a W-phase winding 253. The U-phase winding 251, the V-phase winding 252 and the W-phase winding 253 are respectively wound around the stator 21, and one end of the U-phase winding 251, one end of the V-phase winding 252 and one end of the W-phase winding 253 are electrically connected with each other.

The other winding set 26 includes a U-phase winding 261, a V-phase winding 262 and a W-phase winding 263. The U-phase winding 261, the V-phase winding 262 and the W-phase winding 263 are respectively wound around the stator 21, and one end of the U-phase winding 261, one end of the V-phase winding 262 and one end of the W-phase winding 263 are electrically connected with each other.

The ECU 10 has switching devices 271-276, 281-286 and voltage sensors 250, 260.

One end of the switching device 271 is connected to a positive electrode of a battery (not shown), and the other end of the switching device 271 is connected to one end of the switching device 272. The other end of the switching device 272 is connected to a ground. One end of the switching device 273 is connected to the positive electrode of the battery (not shown), and the other end of the switching device 273 is connected to one end of the switching device 274. The other end of the switching device 274 is connected to the ground. One end of the switching device 275 is connected to the positive electrode of the battery (not shown), and the other end of the switching device 275 is connected to one end of the switching device 276. The other end of the switching device 276 is connected to the ground.

One end of the switching device 281 is connected to the positive electrode of the battery (not shown), and the other end of the switching device 281 is connected to one end of the switching device 282. The other end of the switching device 282 is connected to the ground. One end of the switching device 283 is connected to the positive electrode of the battery (not shown), and the other end of the switching device 283 is connected to one end of the switching device 284. The other end of the switching device 284 is connected to the ground. One end of the switching device 285 is connected to the positive electrode of the battery (not shown), and the other end of the switching device 285 is connected to one end of the switching device 286. The other end of the switching device 286 is connected to the ground.

The other end of the U-phase winding 251 is connected to a connection between the switching device 271 and the switching device 272. The other end of the V-phase winding 252 is connected to a connection between the switching device 273 and the switching device 274. The other end of the W-phase winding 253 is connected to a connection between the switching device 275 and the switching device 276.

The other end of the U-phase winding 261 is connected to a connection between the switching device 281 and the switching device 282. The other end of the V-phase winding 262 is connected to a connection between the switching device 283 and the switching device 284. The other end of the W-phase winding 263 is connected to a connection between the switching device 285 and the switching device 286.

Each of the voltage sensors 250 is installed at a corresponding location between a corresponding one of the switching devices 272, 274, 276 and the ground and is configured to measure an electric potential difference at this location. Each of the voltage sensors 260 is installed at a corresponding location between a corresponding one of the switching devices 282, 284, 286 and the ground and is configured to measure an electric potential difference at this location.

The ECU 10 is configured to control an operation of the electric motor 20 by controlling the electric power supplied to the coil 22. When the electric power is supplied to the coil 22, the rotating magnetic field is generated at the stator 21. Thereby, the rotor 23 is rotated. Thus, the torque is outputted from the shaft 24. As described above, the electric motor 20 is configured to output the torque.

More specifically, the ECU 10 is configured to control the switching operations of the switching devices 271-276, 281-286 to control the electric power supplied from the battery to the winding sets 25, 26. Thus, the ECU 10 can control the operation of the electric motor 20 such that the rotor 23 is rotated forward or backward.

As described above, in the present embodiment, the electric motor 20 has the two winding sets 25, 26, i.e., two winding systems. At the normal time, the torque is outputted from the electric motor 20 through the energization to the two winding systems. At the time of emergency where one of the two winding sets is broken, the electric motor 20 can be operated continuously with the remaining one of the two winding sets. In such a case, the torque, which is outputted from the electric motor 20, is about one half of the torque outputted from the electric motor 20 at the normal time.

The ECU 10 can measure the value of the electric current conducted through the winding sets 25, 26 based on the voltage detected with the respective voltage sensors 250, 260. In this way, the ECU 10 can sense the breakage of the respective winding sets 25, 26.

Figure 13:
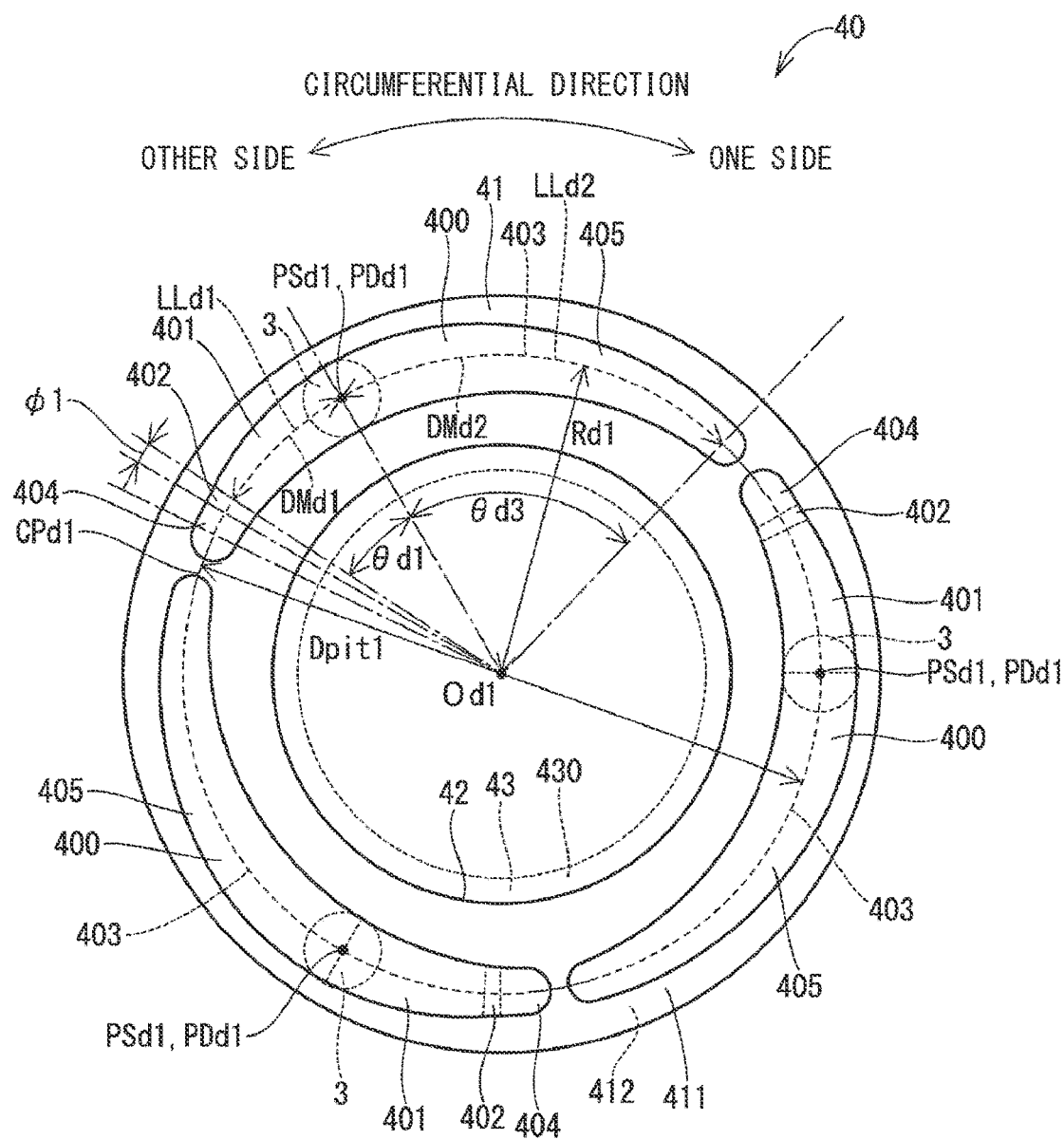
FIG. 13 is a diagram indicating a drive cam of the clutch device according to the third embodiment.

As shown in FIG. 13, in the present embodiment, each of the drive cam grooves 400 has an emergency-time drive cam groove 405. The emergency-time drive cam groove 405 extends toward the one side in the circumferential direction of the drive cam 40 from a drive cam specific point PSd1, which is set at the end of the drive cam slope groove 401 that is opposite to the drive cam connection groove 402 at the drive cam groove 400. The groove bottom 403 at the emergency-time drive cam groove 405 of each drive cam groove 400 is sloped relative to the one end surface 411 of the drive cam 40 such that the depth of the groove bottom 403 at the emergency-time drive cam groove 405 continuously decreases from the drive cam specific point PSd1 toward the one side in the circumferential direction of the drive cam 40. The slope angle of the groove bottom 403 at the emergency-time drive cam groove 405 of each drive cam groove 400 relative to the one end surface 411 of the drive cam 40 is smaller than the slope angle of the groove bottom 403 at the drive cam slope groove 401 relative to the one end surface 411 of the drive cam 40 at the drive cam groove 400. In the circumferential direction of the drive cam 40, a deepest point PDd1, which is a farthest point of the drive cam groove 400 that is farthest from the one end surface 411, coincides with the drive cam specific point PSd1.

Figure 14:
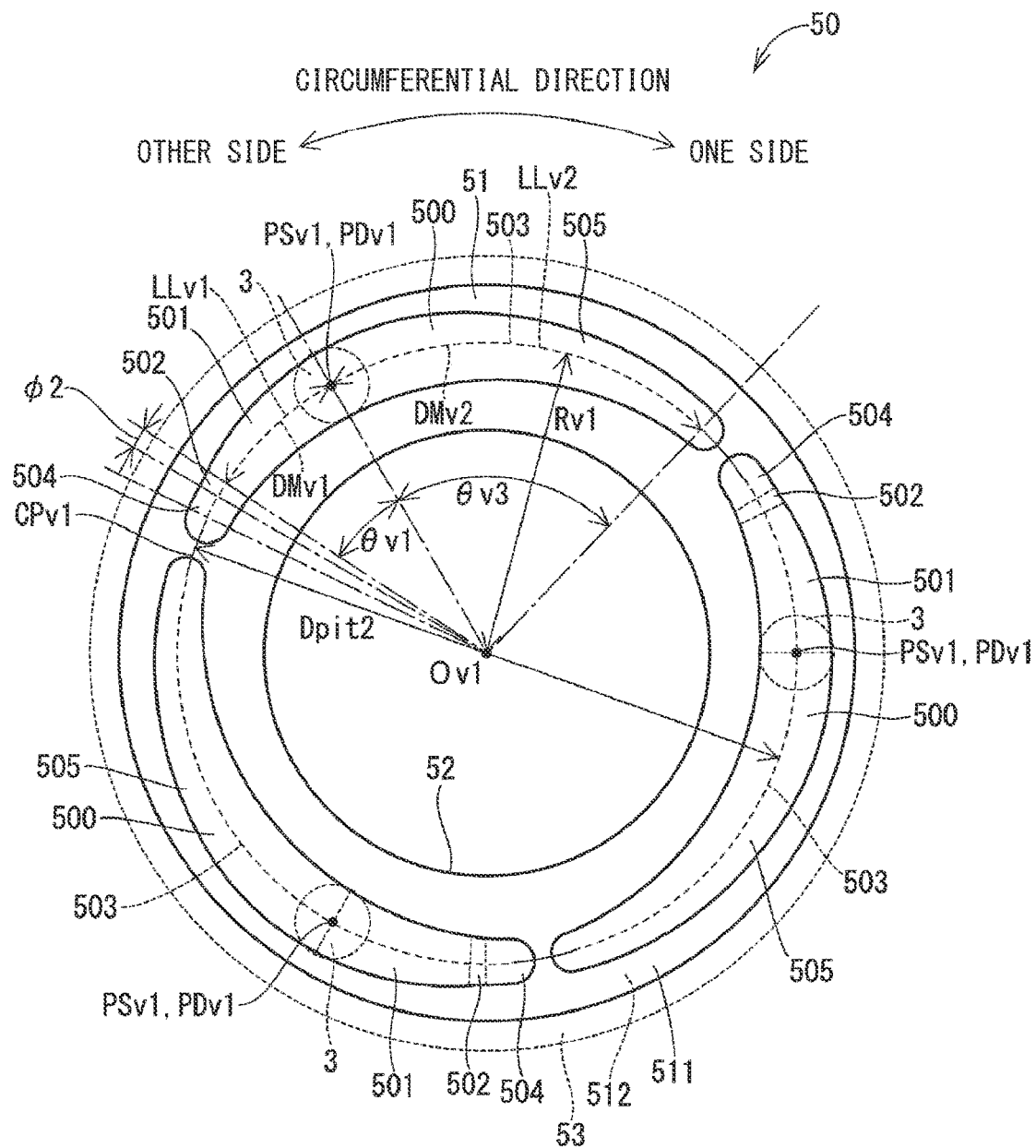
FIG. 14 is a diagram indicating a driven cam of the clutch device according to the third embodiment.

As shown in FIG. 14, each of the driven cam grooves 500 has an emergency-time driven cam groove 505. The emergency-time driven cam groove 505 extends toward the one side in the circumferential direction of the driven cam 50 from a driven cam specific point PSv1, which is set at the end of the driven cam slope groove 501 that is opposite to the driven cam connection groove 502 at the driven cam groove 500. The groove bottom 503 at the emergency-time driven cam groove 505 of each driven cam groove 500 is sloped relative to the one end surface 511 of the driven cam 50 such that the depth of the groove bottom 503 at the emergency-time driven cam groove 505 continuously decreases from the driven cam specific point PSv1 toward the one side in the circumferential direction of the driven cam 50. The slope angle of the groove bottom 503 at the emergency-time driven cam groove 505 of each driven cam groove 500 relative to the one end surface 511 of the driven cam 50 is smaller than the slope angle of the groove bottom 503 at the driven cam slope groove 501 relative to the one end surface 511 of the driven cam 50 at the driven cam groove 500. In the circumferential direction of the driven cam 50, a deepest point PDv1, which is a farthest point of the driven cam groove 500 that is farthest from the one end surface 511, coincides with the driven cam specific point PSv1. Furthermore, the slope angle of the groove bottom 403 at the drive cam slope groove 401 is the same as the slope angle of the groove bottom 503 at the driven cam slope groove 501. Furthermore, the slope angle of the groove bottom 403 at the emergency-time drive cam groove 405 is the same as the slope angle of the groove bottom 503 at the emergency-time driven cam groove 505.

As shown in FIG. 13, a ratio between a tangent value of a slope angle of the groove bottom 403 relative to a circumferential movement distance DMd2 from the drive cam specific point PSd1 at the emergency-time drive cam groove 405 and a tangent value of a slope angle of the groove bottom 403 relative to a circumferential movement distance DMd1 from the drive cam specific point PSd1 at the drive cam slope groove 401 is 1:2.

As shown in FIG. 14, a ratio between a tangent value of the slope angle of the groove bottom 503 relative to a circumferential movement distance DMv2 from the driven cam specific point PSv1 at the emergency-time driven cam groove 505 and a tangent value of the slope angle of the groove bottom 503 relative to a circumferential movement distance DMv1 from the driven cam specific point PSv1 at the driven cam slope groove 501 is 1:2.

As shown in FIG. 13, a ratio between a circumferential angular extent θd3 of an entire locus LLd2 along the groove bottom 403 of the emergency-time drive cam groove 405 and a circumferential angular extent θd1 of an entire locus LLd1 along the groove bottom 403 of the drive cam slope groove 401 is 2:1. Here, the circumferential angular extent θd3 corresponds to an angle defined between a straight line, which connects between the center Od1 of the drive cam 40 and the drive cam specific point PSd1, and a straight line, which connects between the center Od1 and an end of the locus LLd2 along the groove bottom 403 of the emergency-time drive cam groove 405. Furthermore, the circumferential angular extent θd1 corresponds to an angle defined between a straight line, which connects between the center Od1 of the drive cam 40 and the drive cam specific point PSd1, and a straight line, which connects between the center Od1 and an end of the locus LLd1 along the groove bottom 403 of the drive cam slope groove 401.

As shown in FIG. 14, a ratio between a circumferential angular extent θv3 of an entire locus LLv2 along the groove bottom 503 of the emergency-time driven cam groove 505 and a circumferential angular extent θv1 of an entire locus LLv1 along the groove bottom 503 of the driven cam slope groove 501 is 2:1. Here, the circumferential angular extent θv3 corresponds to an angle defined between a straight line, which connects between the center Ov1 of the driven cam 50 and the driven cam specific point PSv1, and a straight line, which connects between the center Ov1 and an end of the locus LLv2 along the groove bottom 503 of the emergency-time driven cam groove 505. Furthermore, the circumferential angular extent θv1 corresponds to an angle defined between a straight line, which connects between the center Ov1 of the driven cam 50 and the driven cam specific point PSv1, and a straight line, which connects between the center Ov1 and an end of the locus LLv1 along the groove bottom 503 of the driven cam slope groove 501.

As shown in FIG. 13, in the drive cam 40, the number of the drive cam grooves 400, which respectively have the identical structure, is three, and these three drive cam grooves 400 are arranged at equal intervals in the circumferential direction of the drive cam 40. The drive cam slope groove 401 and the emergency-time drive cam groove 405 in each of the drive cam grooves 400 are formed such that the distance Rd1, which is measured between the center Od1 of the drive cam 40 and the groove bottom 403, is constant along the drive cam slope groove 401 and the emergency-time drive cam groove 405 in the circumferential direction of the drive cam 40.

As shown in FIG. 14, in the driven cam 50, the number of the driven cam grooves 500, which respectively have the identical structure, is three, and these three driven cam grooves 500 are arranged at equal intervals in the circumferential direction of the driven cam 50. The driven cam slope groove 501 and the emergency-time driven cam groove 505 in each of the driven cam grooves 500 are formed such that the distance Rv1, which is measured between the center Ov1 of the driven cam 50 and the groove bottom 503, is constant along the driven cam slope groove 501 and the emergency-time driven cam groove 505 in the circumferential direction of the driven cam 50.

The ECU 10 controls the switching operations of the switching devices 271-276, 281-286 to control the electric power supplied to the winding sets 25, 26. Thus, the ECU 10 can control the operation of the electric motor 20. Furthermore, the ECU 10 can determine whether it is the normal time, during which none of the two winding sets 25, 26 is broken, or the emergency time, during which one of the two winding sets 25, 26 is broken, based on the voltages sensed with the voltage sensors 250, 260.

At the normal time, during which none of the two winding sets 25, 26 is broken, the ECU 10 controls the operation of the electric motor 20 such that each of the balls 3 is rolled along the drive cam slope groove 401, the drive cam connection groove 402 and the drive cam planar groove 404 of the corresponding drive cam groove 400 and the driven cam slope groove 501, the driven cam connection groove 502 and the driven cam planar groove 504 of the corresponding driven cam groove 500. At this time, the ECU 10 energizes the two winding sets 25, 26 to output the torque from the electric motor 20, so that the drive cam 40 is rotated relative to the driven cam 50. Thus, the driven cam 50 is axially moved relative to the drive cam 40 and the housing 12 to change the operational state of the clutch 70 to the decoupled state or the coupled state.

In contrast, at the emergency time, during which one of the two winding sets 25, 26 is broken, the ECU 10 controls the operation of the electric motor 20 such that the electric motor 20 is rotated in an opposite direction, which is opposite to the rotational direction of the electric motor 20 at the normal time, so that each of the balls 3 is rolled along the emergency-time drive cam groove 405 of the corresponding drive cam groove 400 and the emergency-time driven cam groove 505 of the corresponding driven cam groove 500. At this time, the ECU 10 energizes the remaining unbroken winding set among the two winding sets 25, 26 to output the torque from the electric motor 20, so that the drive cam 40 is rotated relative to the driven cam 50 such that the ball 3 is rolled along the emergency-time drive cam groove 405 and the emergency-time driven cam groove 505. Thus, the driven cam 50 is axially moved relative to the drive cam 40 and the housing 12 to change the operational state of the clutch 70 to the decoupled state or the coupled state.

Figure 15:
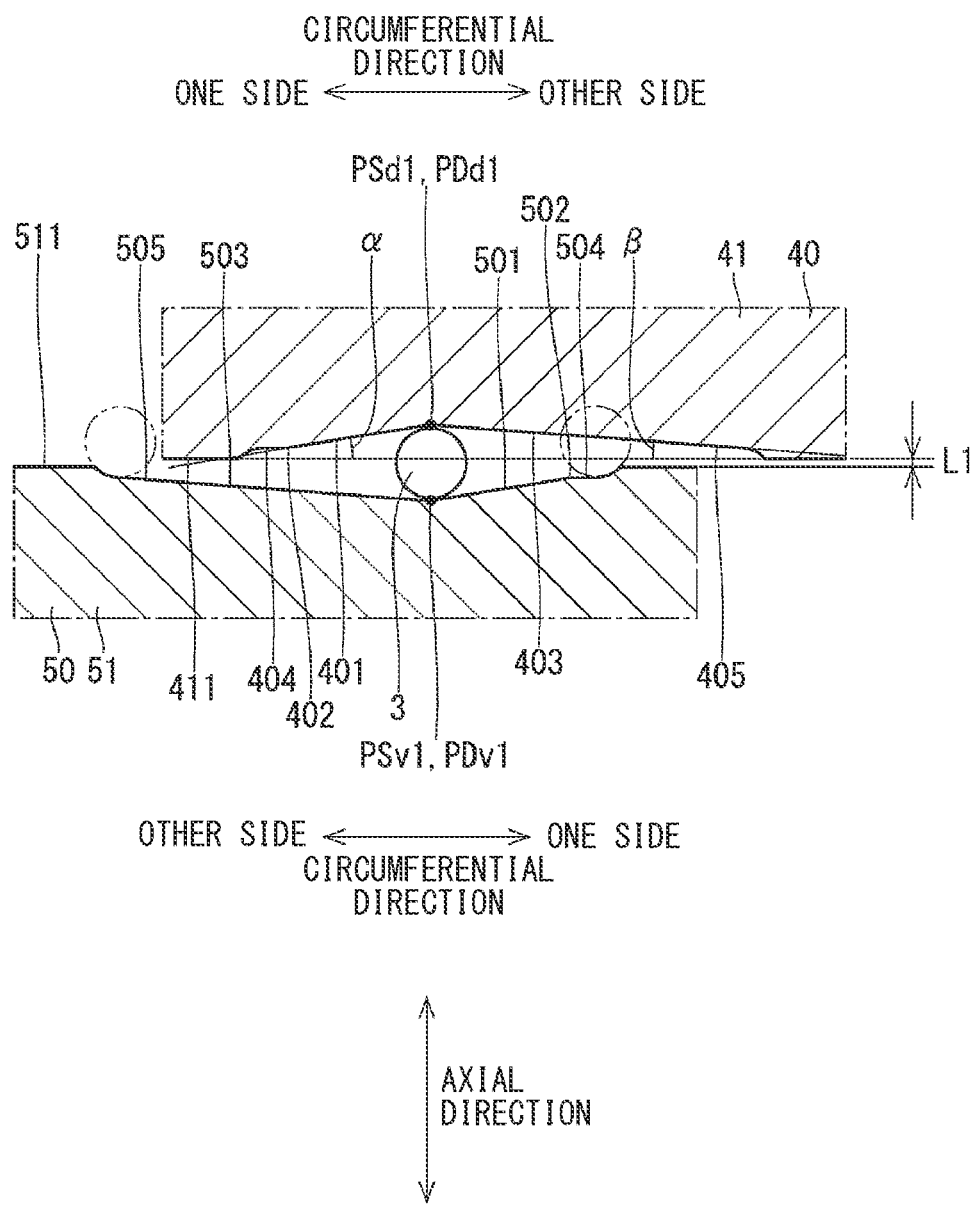
FIG. 15 is a cross-sectional view indicating a drive cam groove and a driven cam groove of the clutch device according to the third embodiment.
Figure 16:
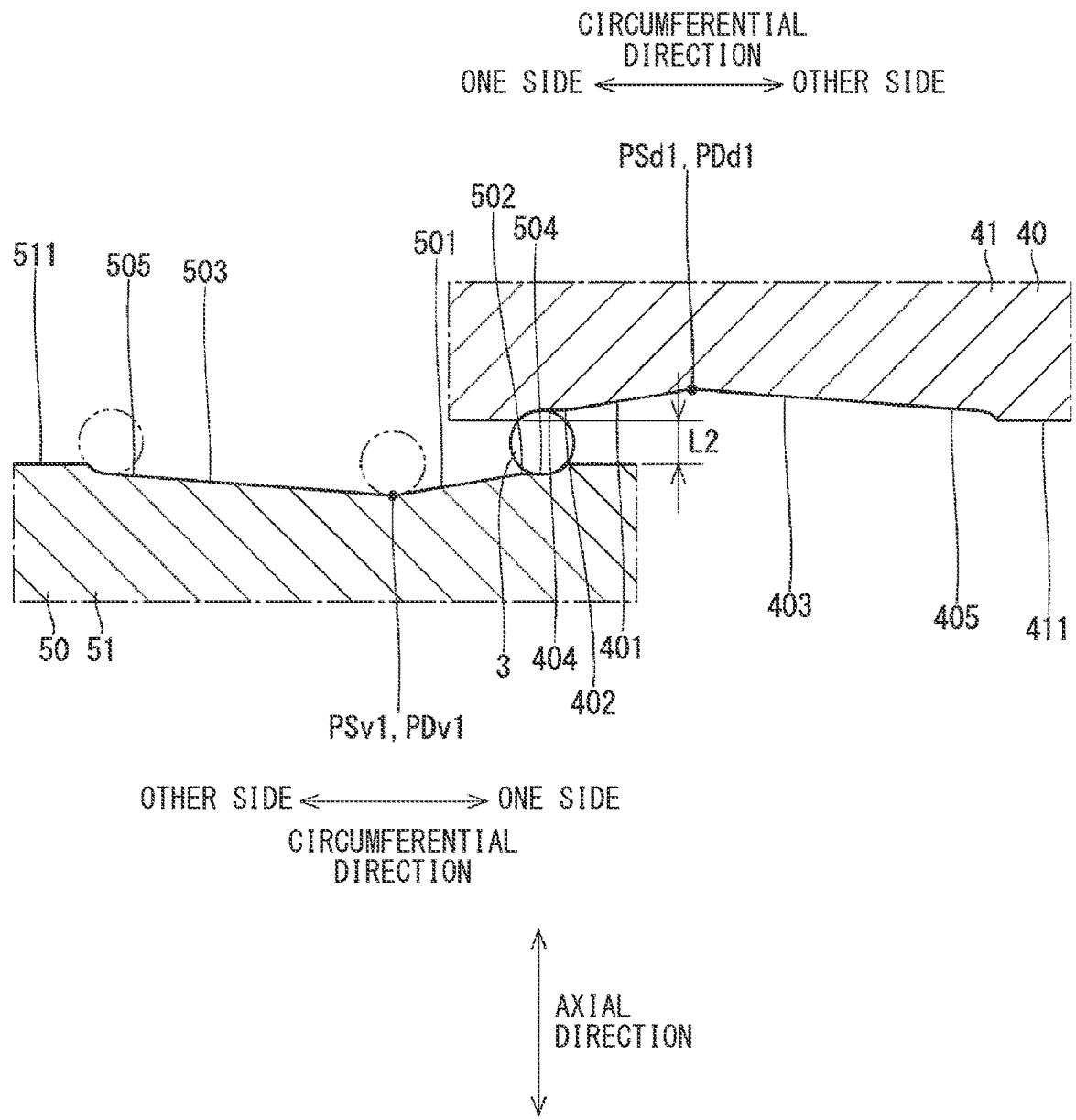
FIG. 16 is a cross-sectional view indicating the drive cam groove and the driven cam groove of the clutch device of the third embodiment, showing a state that is different from FIG. 15.
Figure 17:
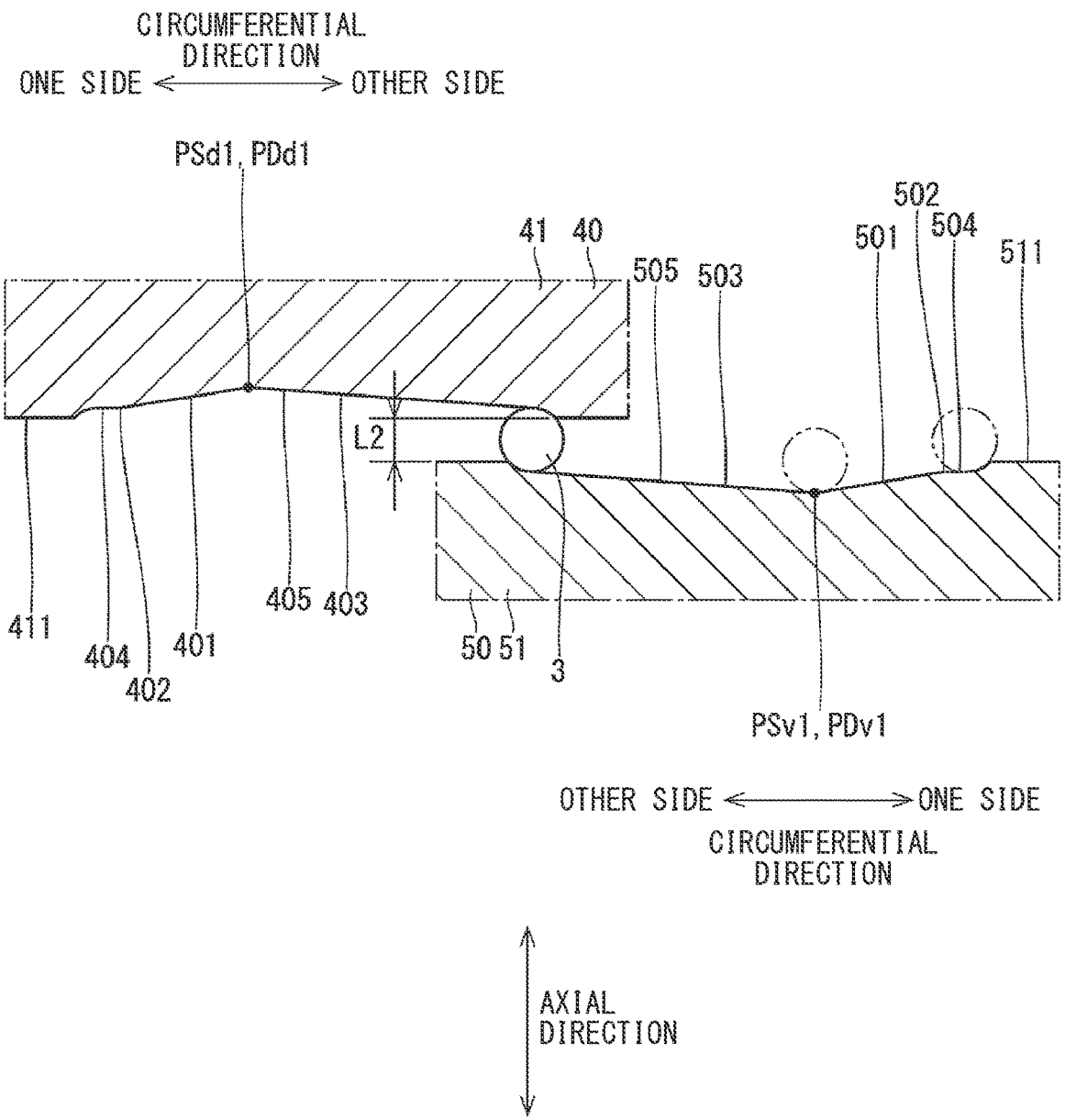
FIG. 17 is a cross-sectional view indicating the drive cam groove and the driven cam groove of the clutch device of the third embodiment, showing a state that is different from FIG. 15.

Next, the operation of the clutch device 1 will be described in further detail. FIGS. 15 to 17 indicate a curved cross section that extends along the groove bottom 403 of the drive cam groove 400 and the groove bottom 503 of the driven cam groove 500 and is parallel to the axis of the drive cam 40 and of the driven cam 50.

As shown in FIG. 15, in the state where the energization of the electric motor 20 is stopped, the ball 3 is located at the drive cam specific point PSd1 and the driven cam specific point PSv1. At this time, the one end surface 411 of the drive cam 40 and the one end surface 511 of the driven cam 50 are spaced from each other by a distance L1.

Here, there is satisfied a relationship of tan α:tan β=2:1 where α denotes the slope angle of the groove bottom 403 at the drive cam slope groove 401, and β denotes the slope angle of the groove bottom 403 at the emergency-time drive cam groove 405.

At the normal time, during which none of the two winding sets 25, 26 is broken, the ball 3 is rolled along the drive cam slope groove 401 and the driven cam slope groove 501 and reaches an end of the drive cam planar groove 404, which is opposite to the drive cam specific point PSd1, and an end of the driven cam planar groove 504, which is opposite to the driven cam specific point PSv1 (see FIG. 16). At this time, the one end surface 411 of the drive cam 40 and the one end surface 511 of the driven cam 50 are spaced from each other by a distance L2.

In contrast, at the emergency time, during which one of the two winding sets 25, 26 is broken, the ball 3 is rolled along the emergency-time drive cam groove 405 and the emergency-time driven cam groove 505 and reaches an end of the emergency-time drive cam groove 405, which is opposite to the drive cam specific point PSd1, and an end of the emergency-time driven cam groove 505, which is opposite to the driven cam specific point PSv1 (see FIG. 17). At this time, the one end surface 411 of the drive cam 40 and the one end surface 511 of the driven cam 50 are spaced from each other by the distance L2.

Figure 18:
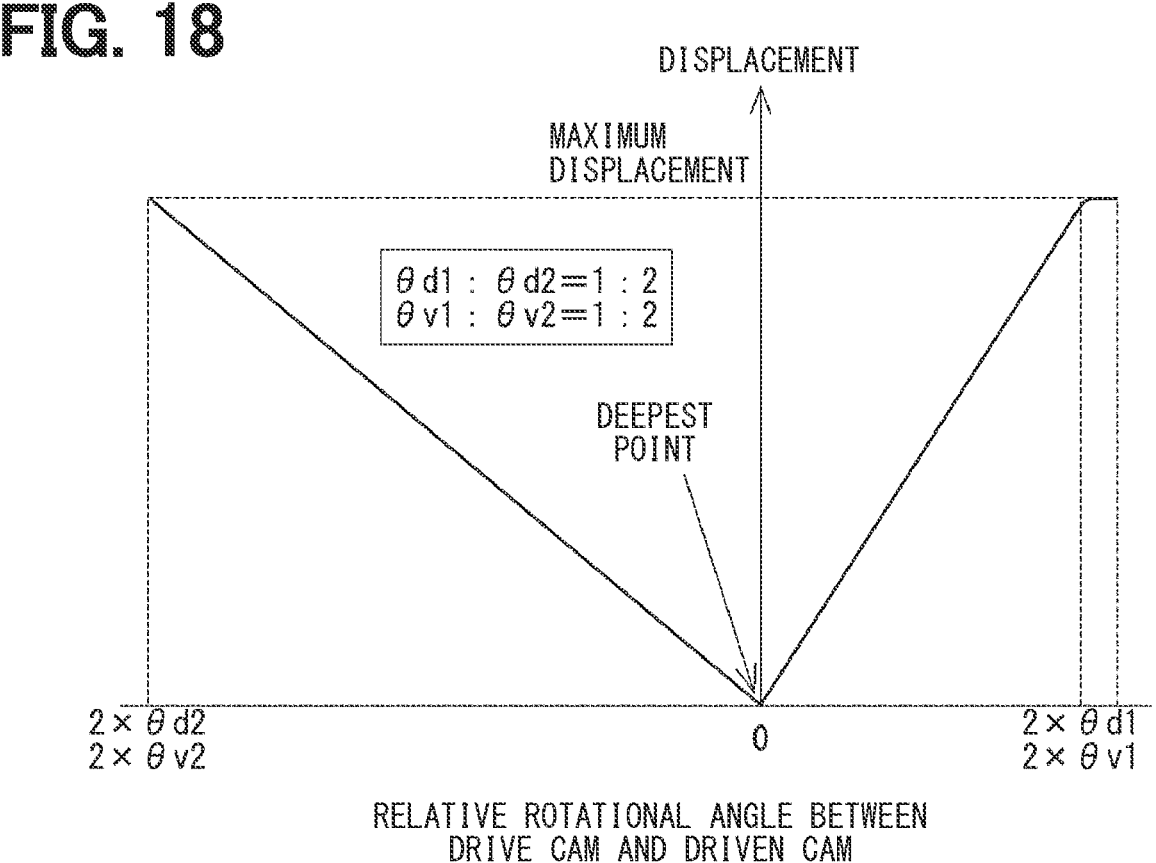
FIG. 18 is a diagram indicating a relationship between: a relative rotational angle between the drive cam and the driven cam of the clutch device; and the amount of displacement of the driven cam relative to the drive cam according to the third embodiment.

As described above, the maximum axial displacement of the driven cam 50 relative to the drive cam 40 is L2−L1 and corresponds to a sum of a groove depth difference between the deepest point PDd1 of the drive cam groove 400 and a shallowest point of the drive cam groove 400, and a groove depth difference between the deepest point PDv1 of the driven cam groove 500 and a shallowest point of the driven cam groove 500. FIG. 18 indicates a relationship between the relative rotational angle between the drive cam 40 and the driven cam 50 and the displacement of the driven cam 50 relative to the drive cam 40.

As described above, in the present embodiment, the slope angle of the emergency-time drive cam groove 405 is set to be ½ of the slope angle of the drive cam slope groove 401, and the slope angle of the emergency-time driven cam groove 505 is set to be ½ of the slope angle of the driven cam slope groove 501. Thereby, when the ball 3 is rolled along the emergency-time drive cam groove 405 and the emergency-time driven cam groove 505, the output torque of the electric motor 20 can be further amplified in comparison to the normal state and converted into a translational thrust. Thus, at the emergency time, during which one of the two winding sets 25, 26 is broken, the electric motor 20 is rotated in the opposite direction, which is opposite to the rotational direction of the electric motor 20 at the normal time, and thereby the clutch 70 can be controlled in the same manner as in the normal time by using the emergency-time drive cam groove 405 and the emergency-time driven cam groove 505.

With the above configurations, in the present embodiment, the maximum translational force, which is substantially the same as the maximum translational force generated by the electric motor 20 at the normal time, can be generated even with the reduced output torque that is outputted from the electric motor 20, in which the winding set of the one system is broken. Thus, it is possible to ensure the maximum transmission torque capacity of the normally open type clutch 70.

In the present embodiment, the drive cam groove 400 has the emergency-time drive cam groove 405, and the driven cam groove 500 has the emergency-time driven cam groove 505. Thus, the slope angle of the drive cam slope groove 401 and the slope angle of the driven cam slope groove 501 are larger in comparison to the first embodiment. Therefore, in the case where the drive cam connection groove 402 and the driven cam connection groove 502 are not provided, the popping may possibly occur at the connection between the drive cam slope groove 401 and the drive cam planar groove 404 and the connection between the driven cam slope groove 501 and the driven cam planar groove 504. In the present embodiment, the drive cam connection groove 402 and the driven cam connection groove 502 are provided, so that the occurrence of the popping can be limited.

In the present embodiment, the slope angle of the emergency-time drive cam groove 405 is gently set to be ½ of the slope angle of the drive cam slope groove 401, and the slope angle of the emergency-time driven cam groove 505 is gently set to be ½ of the slope angle of the driven cam slope groove 501. Thereby, the circumferential length of the emergency-time drive cam groove 405 and the circumferential length of the emergency-time driven cam groove 505 are respectively increased in comparison to the circumferential length of the drive cam slope groove 401 and the circumferential length of the driven cam slope groove 501, so that a required rotational angle is increased at the emergency-time drive cam groove 405 and the emergency-time driven cam groove 505. Furthermore, although the drive response time of the electric motor 20 at the time of moving the ball 3 from the deepest point PDd1, PDV1 to the shallowest point is lengthened due to the decrease in the output torque of the electric motor 20 in the case where the winding set of the one system is broken, this should be allowed due to the emergency time caused by the breakage of the winding set of the one system.

Furthermore, in the present embodiment, the emergency-time drive cam groove 405 is connected to the deepest point PDd1 of the drive cam slope groove 401, and the emergency-time driven cam groove 505 is connected to the deepest point PDv1 of the driven cam slope groove 501. Therefore, at the normal time, when the ball 3 returns to the deepest point PDd1, PDv1, the ball 3 will not collide against the wall surface of the drive cam groove 400 or the wall surface of the driven cam groove 500. Thus, a damage of the constituent elements of the ball cam 2 can be avoided.

In the present embodiment, in the case where the one winding set among the two winding sets 25, 26 is broken, the other remaining winding set can be energized to output the torque from the electric motor 20 to rotate the drive cam 40. As a result, even when the one winding set among the two winding sets 25, 26 of the electric motor 20 is broken, the operation of the clutch device 1 can be continued.

Here, in the case where the one winding set among the two winding sets 25, 26 of the electric motor 20 is broken, the torque outputted from the electric motor 20 is reduced in comparison to the torque outputted from the electric motor 20 before the time of occurrence of the breakage of the one winding set among the two winding sets 25, 26. In view of this point, in the present embodiment, the slope angle of the groove bottom 403 at the emergency-time drive cam groove 405 and the slope angle of the groove bottom 503 at the emergency-time driven cam groove 505 are set to be smaller than the slope angle of the groove bottom 403 at the drive cam slope groove 401 and the slope angle of the groove bottom 503 at the driven cam slope groove 501, respectively. Thereby, when the ball 3 is rolled along the emergency-time drive cam groove 405 and the emergency-time driven cam groove 505, the drive cam 40 can be rotated with a small torque. Thus, at the normal time, during which none of the two winding sets is broken, the operation of the electric motor 20 is controlled such that the ball 3 is rolled along the drive cam slope groove 401 and the driven cam slope groove 501. Furthermore, at the emergency time, during which the one winding set among the two winding sets is broken, the operation of the electric motor 20 is controlled such that the ball 3 is rolled along the emergency-time drive cam groove 405 and the emergency-time driven cam groove 505, so that the operation of the clutch device 1 can be reliably continued.

Fourth Embodiment

Figure 19:
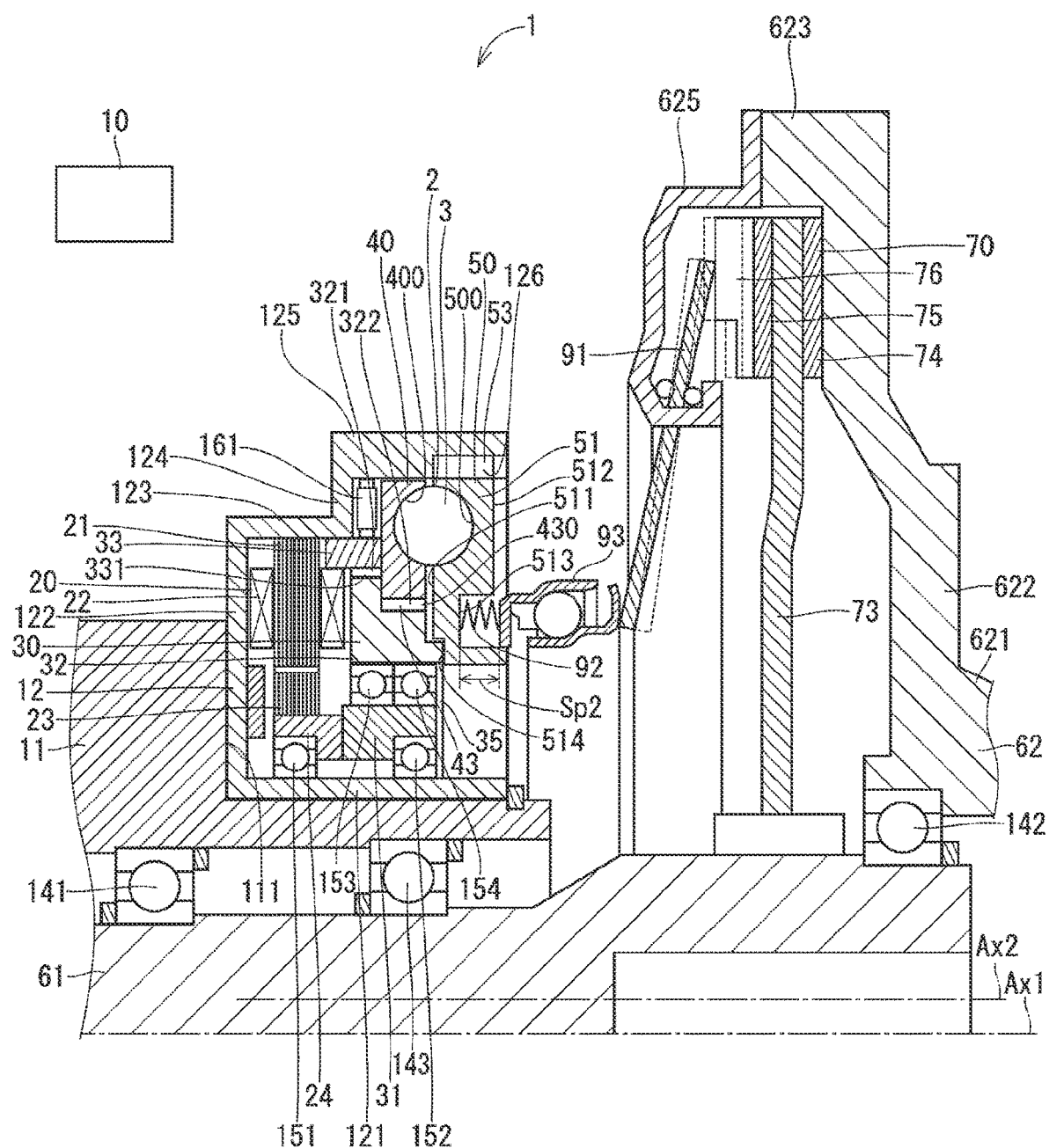
FIG. 19 is a cross-sectional view of a clutch device according to a fourth embodiment.

FIG. 19 indicates a clutch device according to a fourth embodiment. The fourth embodiment differs from the first embodiment with respect to the configurations of the clutch and the state shifter.

In the present embodiment, bearings 141, 143 are installed between the inner peripheral wall of the stationary flange 11 and the outer peripheral wall of the input shaft 61. Therefore, the input shaft 61 is rotatably supported by the stationary flange 11 through the bearings 141, 143.

The housing 12 is installed to the stationary flange 11 such that the inner peripheral wall of the inner tubular portion 121 is opposed to an outer peripheral wall of an end part of the stationary flange 11, and the inner bottom portion 122 contacts a stepped surface 111 of the stationary flange 11. The housing 12 is fixed to the stationary flange 11 by bolts (not shown). Here, the housing 12 is coaxial with the stationary flange 11 and the input shaft 61.

Like in the first embodiment, the electric motor 20, the speed reducer 30 and the ball cam 2 are placed at the inside of the outer tubular portions 123, 125 of the housing 12. Like in the first embodiment, the drive cam 40 is placed at the inside of the outer tubular portion 125 (serving as the tubular portion) of the housing 12 on the side of the ring gear 33, which is opposite to the stator 21, such that the drive cam internal teeth 43 of the ring gear 430 are meshed with the secondary external teeth 322 of the planetary gear 32.

In the present embodiment, the output shaft 62 includes the shaft portion 621, the plate portion 622, the tubular portion 623 and a cover 625. The shaft portion 621 is shaped generally in the cylindrical tubular form. The plate portion 622 is formed integrally with the shaft portion 621 in one-piece such that the plate portion 622 is shaped in the ring plate form and radially outwardly extends from the one end of the shaft portion 621. The tubular portion 623 is formed integrally with the plate portion 622 in one-piece such that the tubular portion 623 is shaped generally in the cylindrical tubular form and extends from the outer peripheral part of the plate portion 622 toward the side that is opposite to the shaft portion 621. The output shaft 62 is rotatably supported by the input shaft 61 through the bearing 142.

The clutch 70 includes a support portion 73, friction plates 74, 75 and a pressure plate 76. The support portion 73 is located on a side of the plate portion 622 of the output shaft 62, at which the driven cam 50 is placed. The support portion 73 is shaped generally in a circular ring plate form and radially outwardly extends from an outer peripheral wall of an end part of the input shaft 61.

The friction plate 74 is shaped generally in a circular ring plate form and is installed to a side of an outer peripheral part of the support portion 73 where the plate portion 622 of the output shaft 62 is placed. The friction plate 74 is fixed to the support portion 73. The friction plate 74 can contact the plate portion 622 when the outer peripheral part of the support portion 73 is deformed toward the plate portion 622.

The friction plate 75 is shaped generally in a circular ring plate form and is installed to another side of the outer peripheral part of the support portion 73, which is opposite to the plate portion 622 of the output shaft 62. The friction plate 75 is fixed to the support portion 73.

The pressure plate 76 is shaped generally in a circular ring plate form and is located on a side of the friction plate 75 where the driven cam 50 is placed.

In a coupled state where the friction plate 74 and the plate portion 622 contact with each other, i.e., are coupled with each other, a frictional force is generated between the friction plate 74 and the plate portion 622, and relative rotation between the friction plate 74 and the plate portion 622 is limited according to the amount of this frictional force. In contrast, in a decoupled state where the friction plate 74 and the plate portion 622 are spaced from each other, i.e., are decoupled from each other, the frictional force is not generated between the friction plate 74 and the plate portion 622, and thereby relative rotation between the friction plate 74 and the plate portion 622 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

The cover 625 is shaped generally in a circular ring form and is installed to the tubular portion 623 of the output shaft 62 such that the cover 625 covers a side of the pressure plate 76, which is opposite to the friction plate 75.

In the present embodiment, the clutch device 1 includes a diaphragm spring 91, which serves as the state shifter, in place of the piston 81. The diaphragm spring 91 is shaped generally in a circular ring form and is installed to the cover 625 such that an outer peripheral part of the diaphragm spring 91 contacts the pressure plate 76. The outer peripheral part of the diaphragm spring 91 is located on a side of an inner peripheral part of the diaphragm spring 91 where the clutch 70 is placed, and an intermediate part of the diaphragm spring 91, which is located between the outer peripheral part and the inner peripheral part of the diaphragm spring 91, is supported by the cover 625. Furthermore, the diaphragm spring 91 urges the pressure plate 76 toward the friction plate 75 through the outer peripheral part of the diaphragm spring 91. Thus, the pressure plate 76 is urged against the friction plate 75, and the friction plate 74 is urged against the plate portion 622. Specifically, the clutch 70 is normally placed in the coupled state.

In the present embodiment, the clutch device 1 is a normally closed type clutch device that is normally placed in the coupled state.

In the present embodiment, a return spring 92 and a release bearing 93 are provided in place of the return spring 82, the retaining portion 83 and the thrust bearing 162.

The return spring 92 is, for example, a coil spring and is installed in a recess 513 that is shaped in an annular form and is recessed at a surface of the driven cam 50, which is opposite to the drive cam 40.

The release bearing 93 is placed between the return spring 92 and the inner peripheral part of the diaphragm spring 91. The return spring 92 urges the release bearing 93 toward the diaphragm spring 91. The release bearing 93 rotatably supports the diaphragm spring 91 while the release bearing 93 receives a load from the diaphragm spring 91 in a thrust direction. The urging force of the return spring 92 is smaller than the urging force of the diaphragm spring 91.

As shown in FIG. 19, in a state where each of the balls 3 is placed at one end of the corresponding drive cam groove 400 and one end of the corresponding driven cam groove 500, a distance between the drive cam 40 and the driven cam 50 is relatively small, and a gap Sp2 is formed between the release bearing 93 and a bottom of the recess 513 of the driven cam 50. Thus, the friction plate 74 is urged against the plate portion 622 by the urging force of the diaphragm spring 91, and the clutch 70 is placed in the coupled state so that the transmission of the torque between the input shaft 61 and the output shaft 62 is enabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled along the corresponding drive cam groove 400 and the corresponding driven cam groove 500. As a result, the driven cam 50 is axially moved relative to the drive cam 40, i.e., is moved toward the clutch 70. Thereby, the gap Sp2 between the release bearing 93 and the recess 513 of the driven cam 50 is reduced, and the return spring 92 is compressed in the axial direction between the driven cam 50 and the release bearing 93.

When the driven cam 50 is further moved toward the clutch 70, the return spring 92 is compressed to its maximum amount, so that the release bearing 93 is urged toward the clutch 70 by the driven cam 50. Thus, the release bearing 93 urges the inner peripheral part of the diaphragm spring 91 and is moved toward the clutch 70 against a reaction force applied from the diaphragm spring 91.

When the release bearing 93 urges the inner peripheral part of the diaphragm spring 91 and is moved toward the clutch 70, the inner peripheral part of the diaphragm spring 91 is moved toward the clutch 70, and the outer peripheral part of the diaphragm spring 91 is moved toward the side that is opposite to the clutch 70. Thereby, the friction plate 74 is spaced away from the plate portion 622, and the operational state of the clutch 70 is changed from the coupled state to the decoupled state. As a result, the transmission of the torque between the input shaft 61 and the output shaft 62 is disabled.

When the clutch transmission torque becomes 0 (zero), the ECU 10 stops the rotation of the electric motor 20. Thus, the operational state of the clutch 70 is maintained in the decoupled state. As described above, the diaphragm spring 91 can receive the axial force from the driven cam 50 to change the operational state of the clutch 70 to the coupled state or the decoupled state according to the axial position of the driven cam 50 relative to the drive cam 40.

Like in the first embodiment, the clutch 70 is placed on the side of the driven cam 50, which is opposite to the drive cam 40, and the clutch 70 changes the operational state thereof to the coupled state or the decoupled state according to the axial position of the driven cam 50 relative to the drive cam 40.

The configurations of each drive cam groove 400 and each driven cam groove 500 are the same as those of the first embodiment and are thereby not described for the sake of simplicity.

As shown in FIG. 19, in the present embodiment, at least a part of each drive cam groove 400 overlaps with the speed reducer 30 in the axial direction of the drive cam 40.

Specifically, each drive cam groove 400 entirely overlaps with the ring gear 430 (serving as the output member), which is the portion of the speed reducer 30, in the axial direction of the drive cam 40. Thereby, the size of the clutch device 1, which is measured in the axial direction of the drive cam 40, can be reduced or minimized.

In the present embodiment, the speed reducer 30 further includes an extending portion 35 in place of the limiting portion 34. The extending portion 35 is formed integrally with the planetary gear 32 in one-piece such that the extending portion 35 is shaped in a tubular form and extends from an axial end surface of the planetary gear 32, which is located on the clutch 70 side, toward the clutch 70. An inner peripheral wall of the extending portion 35 is engaged with the outer peripheral wall of the bearing 154.

The driven cam 50 further includes a recess 514. The recess 514 is shaped in a circular form and is recessed from an inner peripheral part of the one end surface 511 of the driven cam main body 51, which is located on the drive cam 40 side, toward the clutch 70. An end part of the extending portion 35, which is located on the clutch 70 side, is placed at an inside of the recess 514.

Here, each drive cam groove 400 entirely overlaps with the planetary gear 32 (the portion of the speed reducer 30), particularly with the secondary external teeth 322 of the planetary gear 32 in the axial direction of the drive cam 40.

Furthermore, an axial part of the extending portion 35 of the speed reducer 30 is located on the radially inner side of the driven cam grooves 500 of the driven cam 50. Specifically, in the present embodiment, at least a portion of each driven cam groove 500 overlaps with the extending portion 35 (the portion of the speed reducer 30) in the axial direction of the driven cam 50. Thereby, the size of the clutch device 1, which is measured in the axial direction of the drive cam 40 and the driven cam 50, can be reduced or minimized.

The rest of the present embodiment, which is other than the above described points, is the same as that of the first embodiment.

As described above, the present disclosure can be applied to the normally closed type clutch device.

Other Embodiments

In another embodiment, the circumferential angular extent ø1 of the drive cam connection groove 402 is not necessarily in the range of 1 to 6 [deg.] in the circumferential direction of the drive cam 40. Furthermore, the circumferential angular extent ø2 of the driven cam connection groove 502 is not necessarily in the range of 1 to 6 [deg.] in the circumferential direction of the driven cam 50.

Furthermore, in another embodiment, the drive cam connection groove 402 may not be formed to satisfy the equation of R1=Dpit1/2·π/180·ø1/cos γ1. Also, the driven cam connection groove 502 may not be formed to satisfy the equation of R2=Dpit2/2·π/180·ø2/cos γ2.

Furthermore, in another embodiment, each of the groove bottom 403 at the drive cam connection groove 402 and the groove bottom 503 at the driven cam connection groove 502 may not extend along the arc that has the predetermined radius R1, R2 as long as the slope angle of the groove bottom 403 at the drive cam connection groove 402 and the slope angle of the groove bottom 503 at the driven cam connection groove 502 continuously change.

Furthermore, in the second embodiment, there is described the example where the drive cam slope groove 401 is formed such that the distance between the center Od1 of the drive cam 40 and the groove bottom 403 at the drive cam slope groove 401 continuously increases from the one side toward the other side in the circumferential direction of the drive cam 40, and the driven cam slope groove 501 is formed such that the distance between the center Ov1 of the driven cam 50 and the groove bottom 503 at the driven cam slope groove 501 continuously increases from the one side toward the other side in the circumferential direction of the driven cam 50. Alternatively, in another embodiment, the drive cam slope groove 401 may be formed such that the distance between the center Od1 of the drive cam 40 and the groove bottom 403 at the drive cam slope groove 401 continuously decreases from the one side toward the other side in the circumferential direction of the drive cam 40, and the driven cam slope groove 501 may be formed such that the distance between the center Ov1 of the driven cam 50 and the groove bottom 503 at the driven cam slope groove 501 continuously decreases from the one side toward the other side in the circumferential direction of the driven cam 50.

Furthermore, in another embodiment, the number of the drive cam grooves 400, the number of the driven cam grooves 500 are not necessarily limited to three and may be changed to four or more. Furthermore, the number of the balls 3 is not necessarily limited to three and may be changed to four or more according to the number of the drive cam grooves 400 and the number of the driven cam grooves 500.

Furthermore, in the above embodiments, there is described the example where the ball 3, which is shaped in the spherical form, is used as the rolling element placed between the drive cam 40 and the driven cam 50. Alternatively, in another embodiment, the rolling element is not necessarily limited to the spherical form, and a roller, which is shaped in a cylindrical form, may be used as the rolling element.

Furthermore, the present disclosure is not necessarily applied to the vehicle driven by the drive torque generated from the internal combustion engine and may be applied to an electric vehicle or a hybrid vehicle that can travel with drive torque generated from an electric motor.

Furthermore, in another embodiment, the torque may be inputted from the second transmitter, and the torque may be outputted from the first transmitter through the clutch. Furthermore, in a case where one of the first transmitter and the second transmitter is non-rotatably fixed, rotation of the other one of the first transmitter and the second transmitter can be stopped by placing the clutch in the coupled state. In such a case, the clutch device may be used as a brake device.

As described above, the present disclosure is not necessarily limited to the above-described embodiments and may be implemented in various forms without departing from the gist thereof.

The present disclosure has been described based on the embodiments. However, the present disclosure is not necessarily limited to the embodiments and structures described therein. The present disclosure also covers various modifications of the above embodiments and modifications within an equivalent range. Further, various combinations and forms, and other combinations and forms including only one element, more, or less than them are also within the scope and spirit of the present disclosure.

What is claimed is:

1. A rolling element cam comprising:
a drive cam that has a plurality of drive cam grooves formed at one end surface of the drive cam, wherein the drive cam is configured to be rotated by torque outputted from a drive device;
a plurality of rolling elements that are rotatably installed in the plurality of drive cam grooves, respectively; and
a driven cam that has a plurality of driven cam grooves formed at one end surface of the driven cam while each of the plurality of rolling elements is clamped between a corresponding one of the plurality of drive cam grooves and a corresponding one of the plurality of driven cam grooves, wherein:
when relative rotation is made between the driven cam and the drive cam, the driven cam is moved relative to the drive cam in an axial direction;
each of the plurality of drive cam grooves has:
a drive cam slope groove, at which a groove bottom is sloped relative to the one end surface of the drive cam such that a depth of the groove bottom continuously decreases from one side toward another side in a circumferential direction of the drive cam;
a drive cam planar groove, at which the groove bottom is parallel to the one end surface of the drive cam such that the depth of the groove bottom is constant in the circumferential direction of the drive cam; and
a drive cam connection groove that has:
one end connected to an end of the drive cam slope groove located on the another side in the circumferential direction of the drive cam; and
another end connected to an end of the drive cam planar groove located on the one side in the circumferential direction of the drive cam, wherein a slope angle of the groove bottom relative to the one end surface of the drive cam continuously changes from the one end to the another end of the drive cam connection groove;
each of the plurality of driven cam grooves has:
a driven cam slope groove, at which a groove bottom is sloped relative to the one end surface of the driven cam such that a depth of the groove bottom continuously decreases from one side toward another side in a circumferential direction of the driven cam;
a driven cam planar groove, at which the groove bottom is parallel to the one end surface of the driven cam such that the depth of the groove bottom is constant in the circumferential direction of the driven cam; and
a driven cam connection groove that has:
one end connected to an end of the driven cam slope groove located on the another side in the circumferential direction of the driven cam; and
another end connected to an end of the driven cam planar groove located on the one side in the circumferential direction of the driven cam, wherein a slope angle of the groove bottom relative to the one end surface of the driven cam continuously changes from the one end to the another end of the driven cam connection groove.

2. The rolling element cam according to claim 1, wherein:
the drive cam connection groove of each of the plurality of drive cam grooves is formed such that in a cross section that extends along the groove bottom of the drive cam groove and is perpendicular to the one end surface of the drive cam, the groove bottom at the drive cam connection groove extends along an arc that has a predetermined radius R1; and
the driven cam connection groove of each of the plurality of driven cam grooves is formed such that in a cross section that extends along the groove bottom of the driven cam groove and is perpendicular to the one end surface of the driven cam, the groove bottom at the driven cam connection groove extends along an arc that has a predetermined radius R2.

3. The rolling element cam according to claim 2, wherein:
the drive cam connection groove in each of the plurality of drive cam grooves is formed to satisfy an equation of $R1 = Dpit1/2 \cdot \pi/180 \cdot \phi1/\cos \gamma1$, where:
Dpit1 denotes a diameter of a pitch circle, which is a circle that is centered at a center of the drive cam and extends along the groove bottom at the drive cam planar groove in the drive cam groove;
ø1 [deg.] denotes a circumferential angular extent of the drive cam connection groove of the drive cam groove measured in the circumferential direction of the drive cam; and
γ1 denotes the slope angle of the groove bottom at the drive cam slope groove of the drive cam groove relative to the one end surface of the drive cam; and
the driven cam connection groove in each of the plurality of driven cam grooves is formed to satisfy an equation of $R2 = Dpit2/2 \cdot \pi/180 \cdot \phi2/\cos \gamma2$, where:
Dpit2 denotes a diameter of a pitch circle, which is a circle that is centered at a center of the driven cam and extends along the groove bottom at the driven cam planar groove in the driven cam groove;
ø2 [deg.] denotes a circumferential angular extent of the driven cam connection groove of the driven cam groove measured in the circumferential direction of the driven cam; and
γ2 denotes the slope angle of the groove bottom at the driven cam slope groove of the driven cam groove relative to the one end surface of the driven cam.

4. The rolling element cam according to claim 1, wherein:
the drive cam connection groove of each of the plurality of drive cam grooves has a circumferential angular extent that is in a range of 1 to 6 [deg.] in the circumferential direction of the drive cam; and
the driven cam connection groove of each of the plurality of driven cam grooves has a circumferential angular extent that is in a range of 1 to 6 [deg.] in the circumferential direction of the driven cam.

5. The rolling element cam according to claim 1, wherein each of the plurality of drive cam grooves and each of the plurality of driven cam grooves have an identical shape in a view taken from a side where the one end surface of the drive cam is placed or a side where the one end surface of the driven cam is placed.

6. The rolling element cam according to claim 1, wherein:
the plurality of drive cam grooves do not intersect or connect with each other at the one end surface of the drive cam; and
the plurality of driven cam grooves do not intersect or connect with each other at the one end surface of the driven cam.

7. The rolling element cam according to claim 1, wherein:
the drive cam slope groove in each of the plurality of drive cam grooves is formed such that a distance between a center of the drive cam and the groove bottom at the drive cam slope groove continuously changes from the one side toward the another side in the circumferential direction of the drive cam; and
the driven cam slope groove in each of the plurality of driven cam grooves is formed such that a distance between a center of the driven cam and the groove bottom at the driven cam slope groove continuously changes from the one side toward the another side in the circumferential direction of the driven cam.

8. The rolling element cam according to claim 1, wherein:
each of the plurality of drive cam grooves has an emergency-time drive cam groove that extends toward the one side in the circumferential direction of the drive cam from a drive cam specific point, which is set at another end of the drive cam slope groove that is opposite to the drive cam connection groove at the drive cam groove;
the groove bottom at the emergency-time drive cam groove of each of the plurality of drive cam grooves is sloped relative to the one end surface of the drive cam such that the depth of the groove bottom at the emergency-time drive cam groove continuously decreases from the drive cam specific point toward the one side in the circumferential direction of the drive cam;
the slope angle of the groove bottom at the emergency-time drive cam groove of each of the plurality of drive cam grooves relative to the one end surface of the drive cam is smaller than the slope angle of the groove bottom at the drive cam slope groove relative to the one end surface of the drive cam at the drive cam groove;
each of the plurality of driven cam grooves has an emergency-time driven cam groove that extends toward the one side in the circumferential direction of the driven cam from a driven cam specific point, which is set at another end of the driven cam slope groove that is opposite to the driven cam connection groove at the driven cam groove;
the groove bottom at the emergency-time driven cam groove of each of the plurality of driven cam grooves is sloped relative to the one end surface of the driven cam such that the depth of the groove bottom at the emergency-time driven cam groove continuously decreases from the driven cam specific point toward the one side in the circumferential direction of the driven cam; and
the slope angle of the groove bottom at the emergency-time driven cam groove of each of the plurality of driven cam grooves relative to the one end surface of the driven cam is smaller than the slope angle of the groove bottom at the driven cam slope groove relative to the one end surface of the driven cam.

9. A clutch device comprising:
a first transmitter;
a drive device that includes two winding sets and is configured to output torque through energization of the two winding sets;
the rolling element cam of claim 8;
a second transmitter that is configured to transmit the torque between the first transmitter and the second transmitter;
a clutch that is configured to shift an operational state of the clutch to a coupled state or a decoupled state depending on a relative position of the driven cam relative to the drive cam in the axial direction, wherein the clutch is configured to enable transmission of the torque between the first transmitter and the second transmitter through the clutch in the coupled state and disable the transmission of the torque between the first transmitter and the second transmitter through the clutch in the decoupled state; and
a controller that is configured to control the energization of the two winding sets to control an operation of the drive device, wherein:
the controller is configured to control the operation of the drive device such that each of the plurality of rolling elements is rolled along the drive cam slope groove, the drive cam connection groove, the drive cam planar groove of the corresponding one of the plurality of drive cam grooves and the driven cam slope groove, the driven cam connection groove and the driven cam planar groove of the corresponding one of the plurality of driven cam grooves at a normal time, during which none of the two winding sets is broken; and
the controller is configured to control the operation of the drive device such that each of the plurality of rolling elements is rolled along the emergency-time drive cam groove of the corresponding one of the plurality of drive cam grooves and the emergency-time driven cam groove of the corresponding one of the plurality of driven cam grooves at an emergency time, during which one of the two winding sets is broken.

10. A clutch device comprising:
a first transmitter;
a drive device that is configured to output torque;
the rolling element cam of claim 1;
a second transmitter that is configured to transmit the torque between the first transmitter and the second transmitter; and
a clutch that is configured to shift an operational state of the clutch to a coupled state or a decoupled state depending on a relative position of the driven cam relative to the drive cam in the axial direction, wherein the clutch is configured to enable transmission of the torque between the first transmitter and the second transmitter through the clutch in the coupled state and disable the transmission of the torque between the first transmitter and the second transmitter through the clutch in the decoupled state.

* * * * *